(12) United States Patent
Louden

(10) Patent No.: US 8,091,596 B2
(45) Date of Patent: Jan. 10, 2012

(54) NON-PNEUMATIC TYRE ASSEMBLY

(75) Inventor: Bruce Louden, Toowoomba (AU)

(73) Assignee: Big Tyre Pty Ltd, Toowoomba, Queensland (AU)

( * ) Notice: Subject to any disclaimer, the term of this patent is extended or adjusted under 35 U.S.C. 154(b) by 255 days.

(21) Appl. No.: 11/919,455

(22) PCT Filed: Apr. 28, 2006

(86) PCT No.: PCT/AU2006/000568
§ 371 (c)(1),
(2), (4) Date: Jan. 21, 2009

(87) PCT Pub. No.: WO2006/116807
PCT Pub. Date: Nov. 9, 2006

(65) Prior Publication Data
US 2009/0211675 A1     Aug. 27, 2009

(30) Foreign Application Priority Data
Apr. 29, 2005  (AU) ................................. 2005902165

(51) Int. Cl.
*B60C 7/16* (2006.01)
*B60B 9/04* (2006.01)
(52) U.S. Cl. .................. 152/5; 152/86; 152/72; 152/79; 152/80; 152/84
(58) Field of Classification Search ............... 152/5, 11, 152/12, 69, 72, 75, 79, 80, 84, 86
See application file for complete search history.

(56) References Cited

U.S. PATENT DOCUMENTS

| | | | | |
|---|---|---|---|---|
| 396,872 | A | * | 1/1889 | Hicks ............................... 152/84 |
| 854,699 | A | * | 5/1907 | Nash ............................... 152/31 |
| 1,164,887 | A | * | 12/1915 | Strauch et al. ................... 152/84 |
| 1,470,452 | A | | 10/1923 | Kutsche |
| 1,532,911 | A | | 4/1925 | McLain |
| 1,742,100 | A | | 12/1929 | Rozankovich |
| 1,910,250 | A | * | 5/1933 | Hunt et al. .................. 301/35.57 |
| 3,493,027 | A | * | 2/1970 | Dewhirst et al. ................. 152/11 |
| 4,319,785 | A | * | 3/1982 | Sato et al. ....................... 301/6.3 |
| 5,125,443 | A | | 6/1992 | Schwartzman |
| 6,286,572 | B1 | * | 9/2001 | Chen ............................... 152/84 |

FOREIGN PATENT DOCUMENTS

| | | |
|---|---|---|
| FR | 354116 | 9/1905 |
| JP | 54-153759 | 10/1979 |
| JP | 114807 | 7/1984 |
| WO | WO 9964256 | 12/1999 |

* cited by examiner

*Primary Examiner* — Kip T Kotter
(74) *Attorney, Agent, or Firm* — Dilworth & Barrese, LLP.

(57) ABSTRACT

A non-pneumatic wheel assembly (10) which has an outer rim assembly (26), an inner vehicle hub connection member (11), a compartment located between the outer rim assembly (26) and the inner hub connection member (11) which has a plurality of spring elements (21, 22) wherein at least some of the spring elements (21, 22) are attached to the outer rim assembly (26) and/or the inner hub connection member (11) characterised in that the spring elements (21, 22) are oriented in opposed or counteracting orientations.

26 Claims, 20 Drawing Sheets

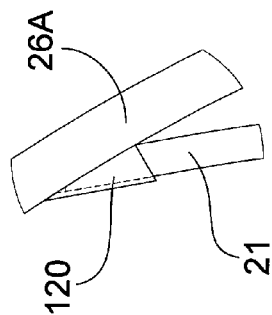
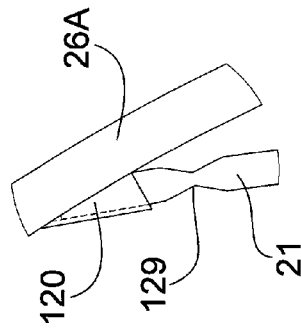
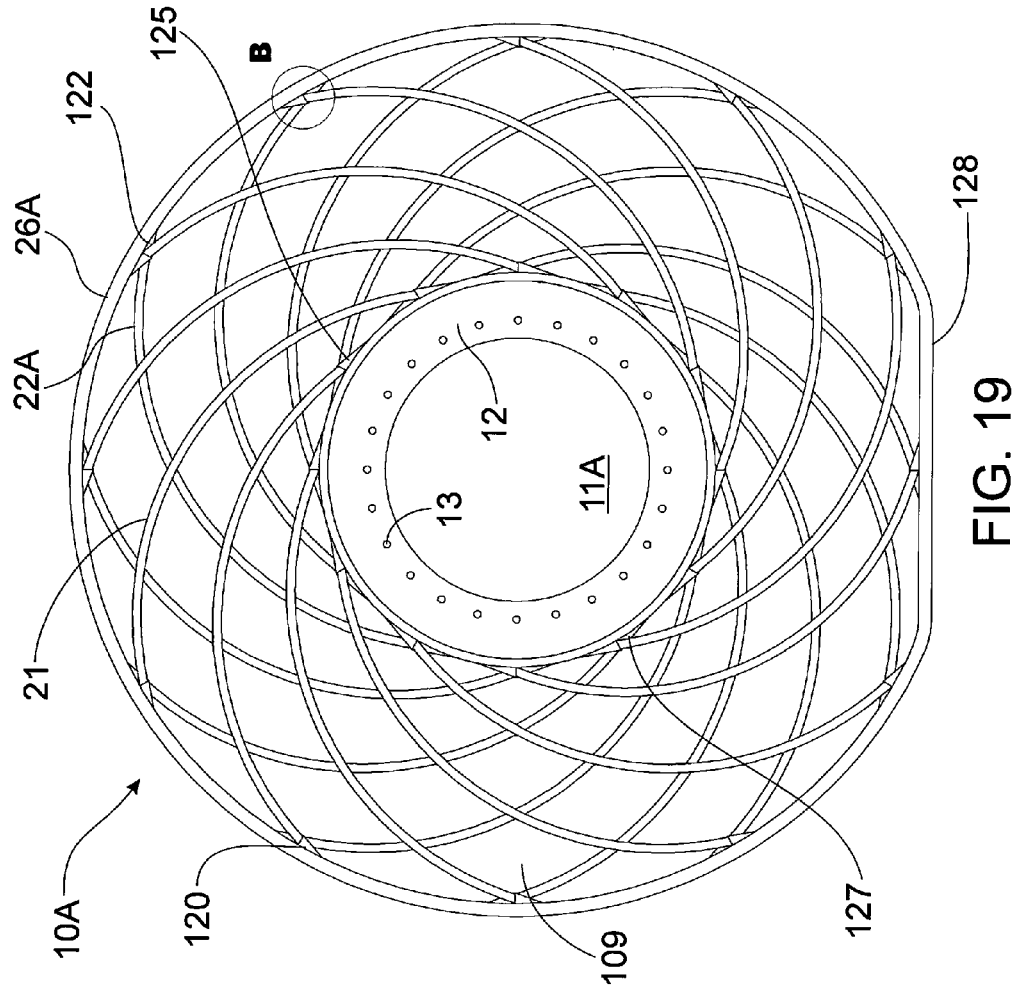

NON-PNEUMATIC TYRE ASSEMBLY

BACKGROUND TO THE INVENTION

The invention comprises of a non-pneumatic wheel assembly, which is designed as an alternative for the conventional pneumatic tyre or solid tyre options currently available.

A major issue with pneumatic tyres is that rubber is a poor conductor of heat and the flexible nature of a pneumatic tyre results in significant heat building up within the rubber walls, shoulders and tread. This heat is compounded in a tyre when carrying heavy loads, travelling at excessive speeds for a given load, excessive road temperatures, and insufficient inflation pressures. If this heat is generated at a faster rate than it can be dissipated, the heat accumulates to the point where it changes the chemical properties of the rubber, destroying its structural strength, causing the tyre to explode. This premature failure of tyres significantly adds to running costs, downtime, and at times, significant danger. The complexity and difficulty of successfully designing very large tyres to meet such demanding conditions using the current tyre technology has resulted in the manufacture of these tyres now being limited to very few companies, and has constrained the development of larger vehicles for more efficient mining.

This heat generation problem is reflected in the principal performance rating of tyres, being their load carrying capacity at a given speed. For large tyres this is expressed in tonne-kph, such as "60 tonne at 50 km/hr" or "100 tonne at just 10 km/hr". Ensuring load and speed conditions are adhered to represents a major problem for tyre companies warranting money-back guarantees on tyre performance. A new wheel or tyre concept is required to eliminate this problem with excessive heat build-up, and enable much larger wheels to be manufactured for the new generation of vehicles.

Solid rubber tyres are used in limited applications, where pneumatic tyres are frequently punctured. Foam filling of pneumatic tyres (instead of air) alleviates this problem where small punctures occur and the tyre structure though perforated, remains intact. However foam filling is very heavy, and it will not help in situations where the tyre structure is easily torn; in these situations solid tyres are currently the only option. Solid tyres are not popular, however, as they offer very little shock absorbance, and the vibrations travelling through the vehicle greatly reduces the ride comfort, and significantly increases the wear and tear of the vehicle.

Most vehicles that use tracks for their traction device also have very limited suspension and this not only reduces ride comfort but also decreases the life of the track by increasing its wear rate.

Pneumatic tyres clearly provide a significant role in vehicle suspension, and it is ideal if this benefit can be maintained in any alternative wheel, which is non-pneumatic, thus alleviating the need to add extra suspension by another means.

A previous example of a non-pneumatic wheel has a relatively stiff but flexible rubber outer rim connected to the inner hub through a series of web spokes which carry very little compressive load. In this case the load is carried by the spokes acting in tension, with the shape of the wheel maintained by the stiffness of the outer rim. This design is not expected to be suitable as a substitute for very large tyres as the thick flexible rubber outer rim is likely to have similar heat-retention properties to that of current tyres.

Pneumatic tyres, which sustain even a small amount of damage, frequently have to be replaced rather than repaired, due to safety and structural considerations. It would be a significant advantage to have a wheel with easily replaceable or repairable components.

Reference may be made to other non pneumatic tyres which include U.S. Pat. No. 4,945,962 which refers to a tyre formed from a unitary honeycomb structure bounded by integrally moulded outer and inner hoops and a single side web member. Reference may also be made to U.S. Pat. No. 4,934,425 and U.S. Pat. No. 4,832,098 which each refer to a non pneumatic tyre having a polyester polyol urethane elastomeric body with a plurality of angular radial ribs interconnected by webbing. U.S. Pat. No. 6,698,480 refers to a non pneumatic tyre having a hub and rim assembly interconnected by a plurality of radially oriented shock absorbing spokes each of which comprise a piston and tube assembly functioning as a clamping mechanism. U.S. Pat. No. 6,374,887 describes a non pneumatic tyre formed from rubber or elastomeric material having an outer crown or hoop having sidewalls joining the crown and terminating in circumferentially extending beads adapted to be received in a wheel rim. A plurality of circumferentially spaced leaf springs are, at their ends resiliently embedded in the respectively beads. U.S. Pat. No. 5,139,066 concerns a non pneumatic tyre having an outer peripheral portion and an inner peripheral portion interconnected by a circumferential web. To each side of the circumferential web are a set of circumferentially spaced ribs connected to the inner and outer peripheral portions of the tyre. Each rib is also connected to the web which has consecutive web sections extending in alternate directions. U.S. Pat. No. 4,784,201 refers to a non pneumatic tyre formed from resilient elastomeric material having circumferentially spaced apart ribs interconnecting an outer cylindrical member and an inner cylindrical member.

Reference may be made to U.S. Pat. No. 3,779,616 which comprises a rigid circular inner structural component which is surrounded by a continuous flexible track having a plurality of pad elements joined together continuously in edge to edge relationship by a plurality of hinges each of which is interposed between adjacent edges of the pad elements. There is also provided a plurality of arcuate members each having a first end pivotally connected to one of the hinges and a second end pivotally connected to another of the hinges. Each arcuate member span at least two hinges and more suitably three hinges. Each arcuate member overlap each other and there is also provided a plurality of crank elements each of which is pivotally connected at one end to one of the arcuate members by a first pivot joint and at another end to the inner circular structural component by a second pivot joint. A lubrication system is also provided for the crank elements so as to facilitate lubrication of the first and second pivot joints.

Reference may also be made to US Patent Application Publication No. 2004/0159385 which describes a non pneumatic tyre having a ground contacting tread position, a reinforced annular band disposed radially inwardly of the tread portion and a plurality of web spokes extending transversely across and radially inwardly from the reinforced annular band and anchored in a hub. The reinforced annular band comprises an elastomeric shear layer, a first membrane adhered to the radial inward extent of the elastomeric shear layer and a second membrane adhered to the radially outward extent of the shear layer. Each of the membranes has a longitudinal tensible modulus of the shear layer so that when under load the ground contacting position of the tyre deforms to a flat contact region through shear strain in the shear layer while maintaining constant the length of the membranes, the web spokes transmitting load forces between the annular and the hub through tension in the web spokes not connected to the ground contacting portion of the tyre.

However in summary of the above prior art it will be appreciated that tyres formed totally from elastomeric material such as rubber will be unsuitable for the major objective of this invention which is directed to provide a non pneumatic tyre wheel which may be used instead of large tyres used in the mining industry. Thus for example, US Patent Application Publication 2004/0159385 would need a very thick outer hoop which has the deficiency of generating excess heat which would cause damage to the tyre.

U.S. Pat. No. 3,779,616 on the other hand refers to a non pneumatic tyre which is complicated structurally requiring crank elements and a lubrication system for the crank elements which would make the tyre expensive to manufacture.

It is therefore an object of the present invention to provide a non pneumatic wheel assembly which may reduce or overcome the disadvantages of the prior art discussed above.

The invention therefore provides a non-pneumatic wheel assembly which has
(i) an outer rim assembly;
(ii) an inner vehicle hub connection member;
(iii) a compartment located between the outer rim assembly and the inner hub connection member which has a plurality of spring elements wherein at least some of the spring elements are attached to the outer rim assembly and/or the inner hub connection member characterised in that the spring elements are oriented in opposing or counteracting orientations.

The outer rim assembly may comprise a continuous annular member of solid or flexible material covered in rubber or other suitable elastomeric material. Alternatively the outer rim assembly instead of forming a continuous annular member may comprise a plurality of traction or rim elements suitably in the form of plates pivotally or hingedly connected to each other as shown in the preferred embodiments herein. Each of these traction elements may have an outer rubber tread element attached thereto so that the outer rim assembly comprises a plurality of traction elements covered in tread elements thereby providing a multiplicity of pads all hingedly connected to each other. This is useful when the non pneumatic wheel assembly of the invention is used as a substitute for a conventional pneumatic tyre. Alternatively the plurality of traction elements may be covered by an annular member of solid rubber. This is useful when the non pneumatic wheel assembly of the invention is to be used as a substitute for a solid wheel and this also applies when the outer rim assembly comprises a continuous annular member covered with an annular rubber tread.

The non pneumatic wheel assembly of the invention may also be used on machinery using tracks, replacing the conventional solid wheels that support the tracks thereby adding suspension. In this example the outer rim assembly may be covered with an annular rubber sheath as a friction grip drive on an internal surface of the tracks. Alternatively the outer rim assembly may have elevated teeth to provide a positive drive for tracks with central drive sprocket apertures.

Therefore, from the above examples of the various types of outer rim assembly it will be appreciated that the non pneumatic wheel assembly may be mounted on large mining trucks, loaders, large underground forklifts, rubber tracked agricultural tractors and steel tracked excavators and bulldozers.

The inner vehicle hub connection member is suitably a solid annular member which has an inwardly extending flange having a plurality of attachment apertures for attachment to a hub of a vehicle in well known conventional manner. The inner hub connection member on an external surface thereof may have a plurality of races for supporting the spring elements. In this embodiment one race may support an array of spring elements which are arcuate corresponding to an arc of a circle as shown in the drawings and all oriented in a similar direction. An adjacent race may support another array of spring elements which are arcuate corresponding to an arc of a circle as shown in the drawings and which extend in an opposing or counteracting orientation. However it will be appreciated that use of the races is not an essential feature and thus the spring elements may be directly attached to an external surface of the inner hub connection member. However the races are useful for preloading the spring elements and providing the means to easily adjust this loading thereafter.

In another embodiment there may be provided inner attachment means for the arcuate spring elements and in one form this may comprise a plurality of attachment lugs or pinning lugs for attachment of a proximal end of an adjacent spring element to the inner hub connection member and more suitably to an adjoining race. Suitably there are provided opposed pairs of pinning lugs whereby the end of a respective spring element may be attached to a suitable pair of lugs by an appropriate fastener. Such inner attachment means may facilitate rotation of each of the spring elements about a common axis of each pair of attachment lugs.

There also may be provided outer attachment means for the two different arrays of curved spring elements as described above and in one form such outer attachment means may have pairs of spaced lugs as described above for the inner attachment means which pairs of spaced lugs extend away from an internal surface of the outer rim assembly.

There also may be provided a plurality of damping elements to act in conjunction with the spring elements to limit unwanted movement or excitation of the spring elements. When the outer rim assembly refers to a plurality of linked plates as described herein the damping elements also assist in maintaining an essentially circular shape of the outer rim assembly when the wheel assembly of the invention is in motion. Such damping elements may comprise hydraulic ram assemblies, gas struts or members having a suitably inwardly directed bias ensuring that the wheel assembly has a circular shape. One example of a damping element is referred to in U.S. Pat. No. 6,698,480 which refers to shock absorbing spokes located between an outer rim assembly and an inner hub member.

Such damping elements may be attached to a central race located on an internal surface of the inner hub connection member and by suitable attachment means which may comprise a single attachment lug or pair of opposed attachment lugs where an adjacent end of a respective clamping element may be attached thereto by a suitable fastener.

The spring elements as discussed above may be of sufficient width to support the wheel assembly of the invention in a single plane with both arrays of opposing spring elements located in a single plane. However more preferably each of the arrays of spring elements are located in different planes. Each spring element of each array may be similar in shape and rotation of the supporting race enables a set force or loading to be applied to each spring element. This enables the load carrying capacity of each spring element to be fine tuned as well as facilitating assembly of the wheel assembly by initially providing the spring elements in a relaxed state prior to forcing them into a compressed state in accordance with design characteristics of the wheel assembly.

It will also be appreciated that where the outer rim assembly comprises a plurality of linked plates, the weight of the vehicle is supported primarily by those spring elements which are located between the inner hub connection member and the ground placed under compression. When the outer rim assembly is a solid annular member the spring elements in an upper half of the wheel assembly are in tension, sharing the load with the lower spring elements which are in compression.

In another form of the invention there may be provided one or more intermediate rings between the inner hub connection member and the outer rim assembly. In the case of a single intermediate ring, there may be provided an inner array of spring members extending between the inner hub connection member and the intermediate ring. There also may be provided an outer array of spring elements extending between the intermediate ring and the outer rim assembly. The function of this form of the invention is to provide a more flexible outer position compared to the inner portion which maintaining load carrying and torque delivering characteristics.

Reference may be made to preferred embodiments of the invention as shown in the attached drawings wherein.

FIGS. 18-22 refer to an alternative embodiment of the invention.

Figure 1:
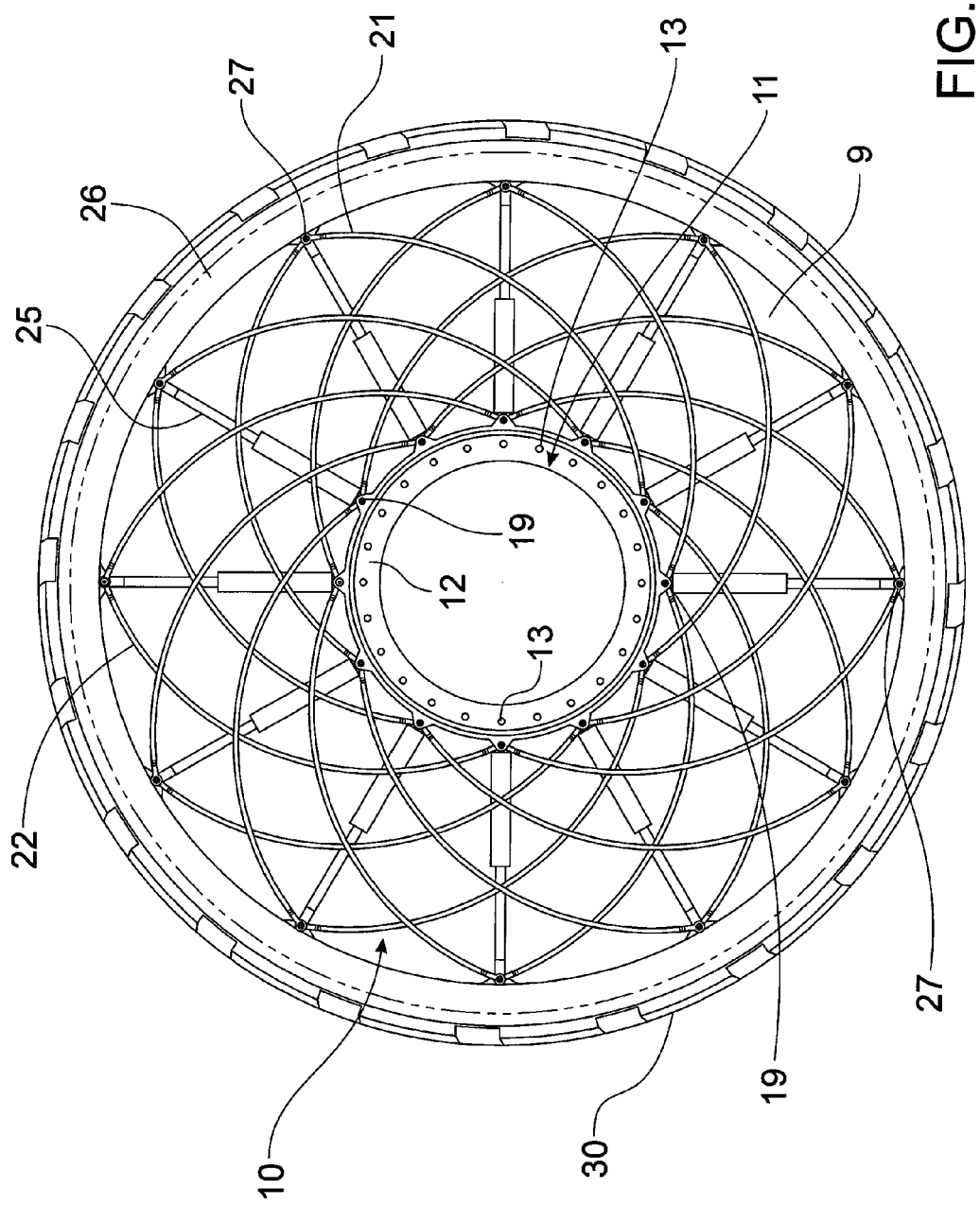
FIG. 1 shows a side view of a first embodiment of a wheel assembly of the invention.
Figure 2:
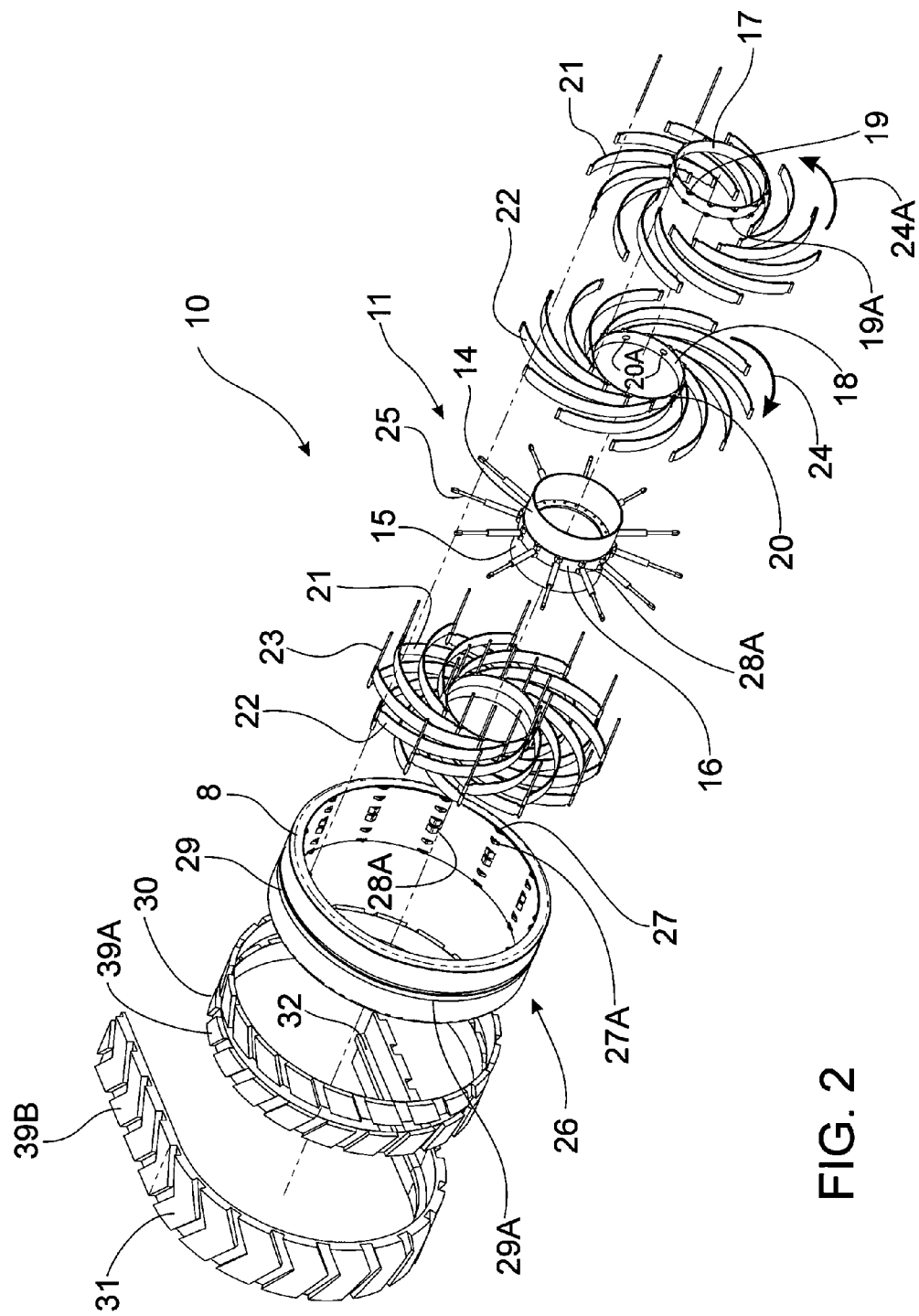
FIG. 2 shows an exploded perspective view of the wheel assembly shown in FIG. 1.
Figure 14:
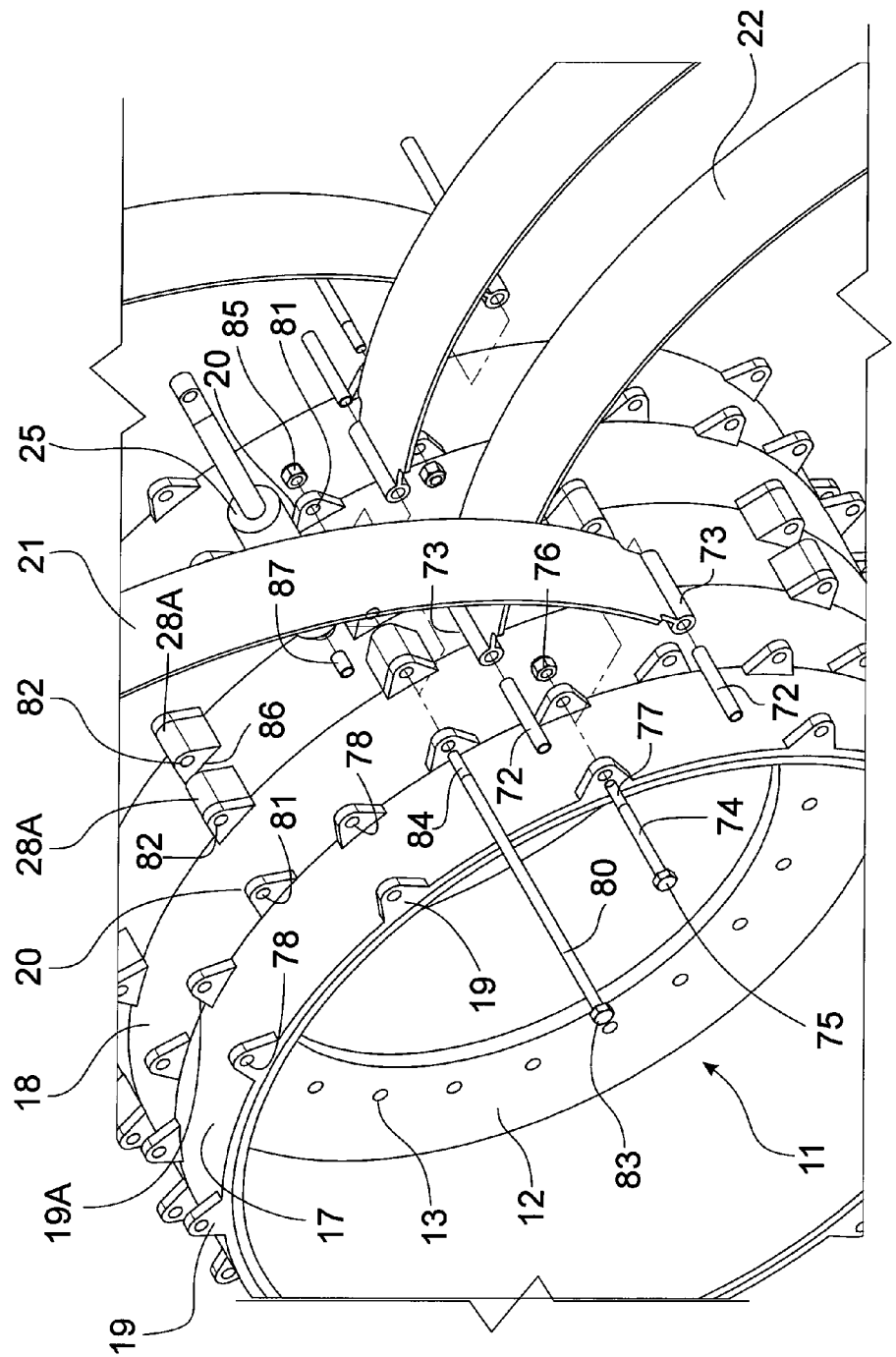
FIG. 14 shows a detailed perspective view of the inner connection means between the hub of the wheel assembly and the spring members.

In FIGS. 1-2 there is illustrated wheel assembly 10 having an inner portion or inner hub connection member in the form of a cylindrical mounting plate 11 which has an inwardly extending flange 12 having attachment apertures 13 for attachment of plate 11 to a suitable hub (not shown) of a vehicle axle. Mounting plate 11 has side planar parts 14 and 15 which each bound a central race 16. Each side part 14 and 15 supports a pair of races 17 and 18. Each race 17 and 18 has opposed pinning lugs 19 and 19A and 20 and 20A. A first set of arcuate spring members 21 are attached to opposed pinning lugs 19 and 19A and a second set of arcuate spring members 22 are attached to opposed pinning lugs 20 and 20A as shown in FIG. 14. Each of lugs 19, 19A, 20 and 20A are similar to lugs 19 and 19A shown in FIG. 14 described hereinafter. Each of spring elements 21 and 22 are contained in internal annular compartment 9 of wheel assembly 10. It will be noted in FIGS. 1-2 that spring members 21 are oriented in an opposing orientation to spring members 22 as shown by arrows 24 and 24A shown in FIG. 2, wherein spring members 21 are convex in a first circumferential direction (24A) and spring members 22 are convex in a second circumferential direction (24) opposite or counteracting to the first circumferential direction.

Thus in regard to the wheel assembly 10 shown in FIGS. 1-2 it will be appreciated that there are two sets of spring members 21 and two sets of spring members 22 on either side of central race 16 and mounted on planar parts 14 and 15 of cylindrical mounting plate 11.

There is also shown damping elements 25 attached to central race 16 which is attached to mounting plate 11 as shown in FIG. 14.

In FIGS. 1-2 there is also shown an outer rim assembly 26 in the form of a solid annular member which has outer opposed pinning lugs 27 and 27A similar to pinning lugs 19 and 19A adjacent each edge 8 of outer rim assembly 26 and a pair of inner opposed pinning lugs 28A similar to pinning lugs 28A shown in FIG. 14. Opposed pinning lugs 27 and 27A support respective outer ends of spring members 21 and opposed pinning lugs 28A support respective outer ends of spring members 22. Fastening assemblies 23 shown in more detail in FIG. 15 attach each of springs 21 and 22 to lugs 27 and 27A and 28A respectively.

Outer rim plate assembly 26 has a central groove 29 and supports a circumferential tractive element 30 or an alternative friction drive track style tractive element 31. Elements 30 and 31 have an inner rib 32 which engages in mating groove 29. Elements 30 and 31 have treads 39A and 39B.

Damping elements 25 are attached to support lugs 28A in a similar manner as shown in FIG. 14 having regard to their attachment to mounting plate 11.

Figure 3:
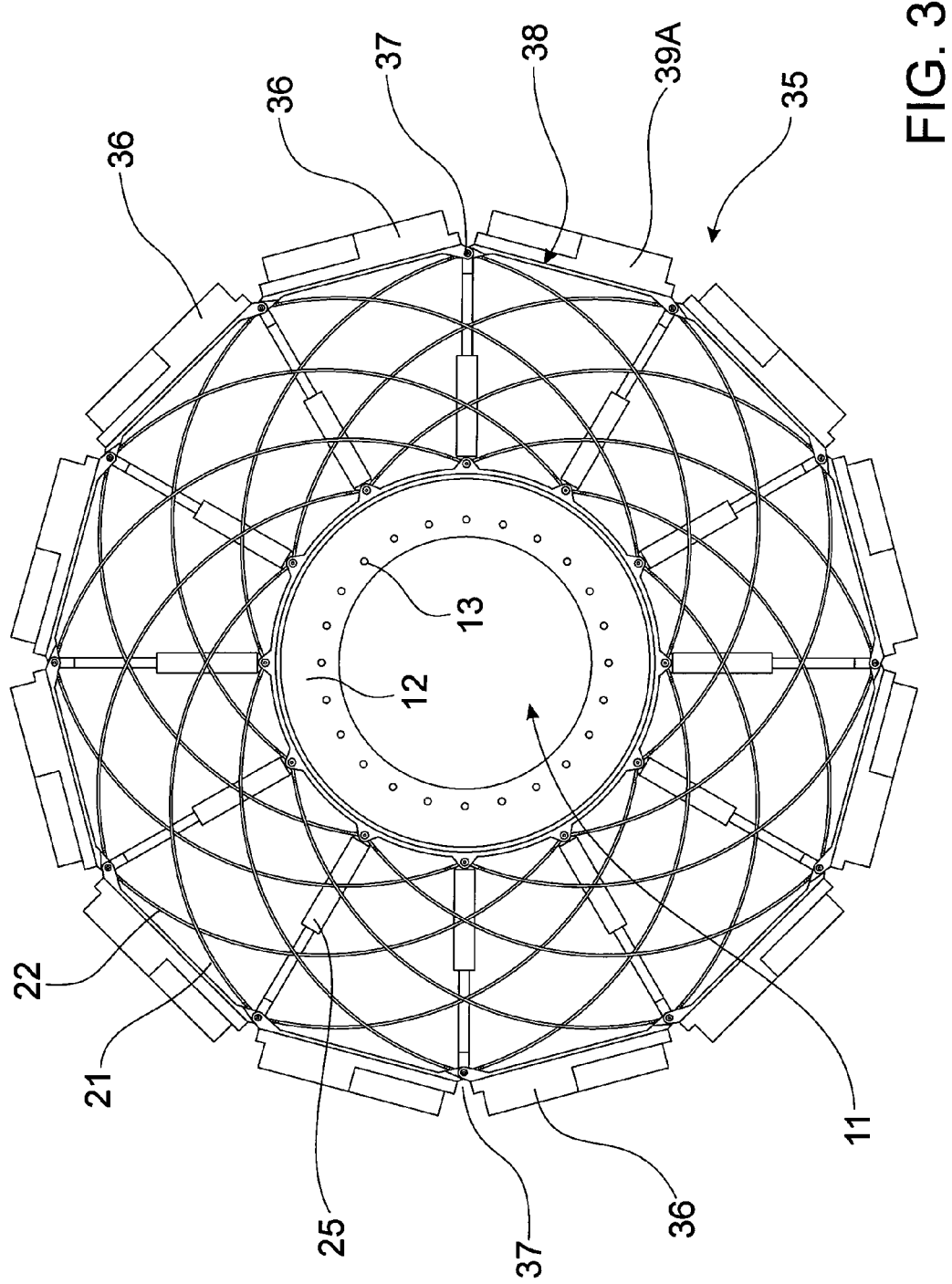
FIG. 3 shows a side view of a second embodiment of a wheel assembly of the invention.
Figure 4:
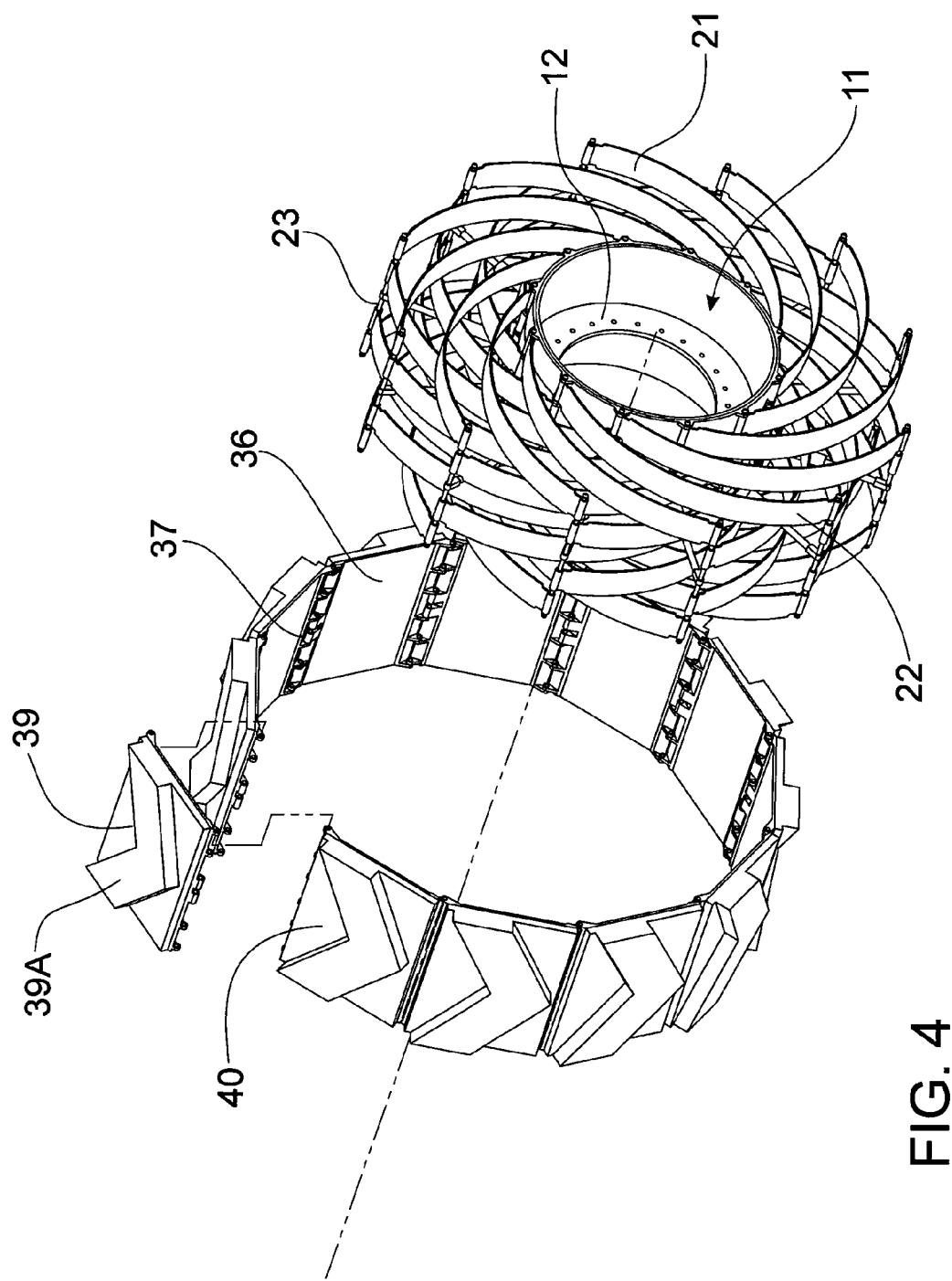
FIG. 4 shows an exploded perspective view of the wheel assembly of FIG. 3.
Figure 15:
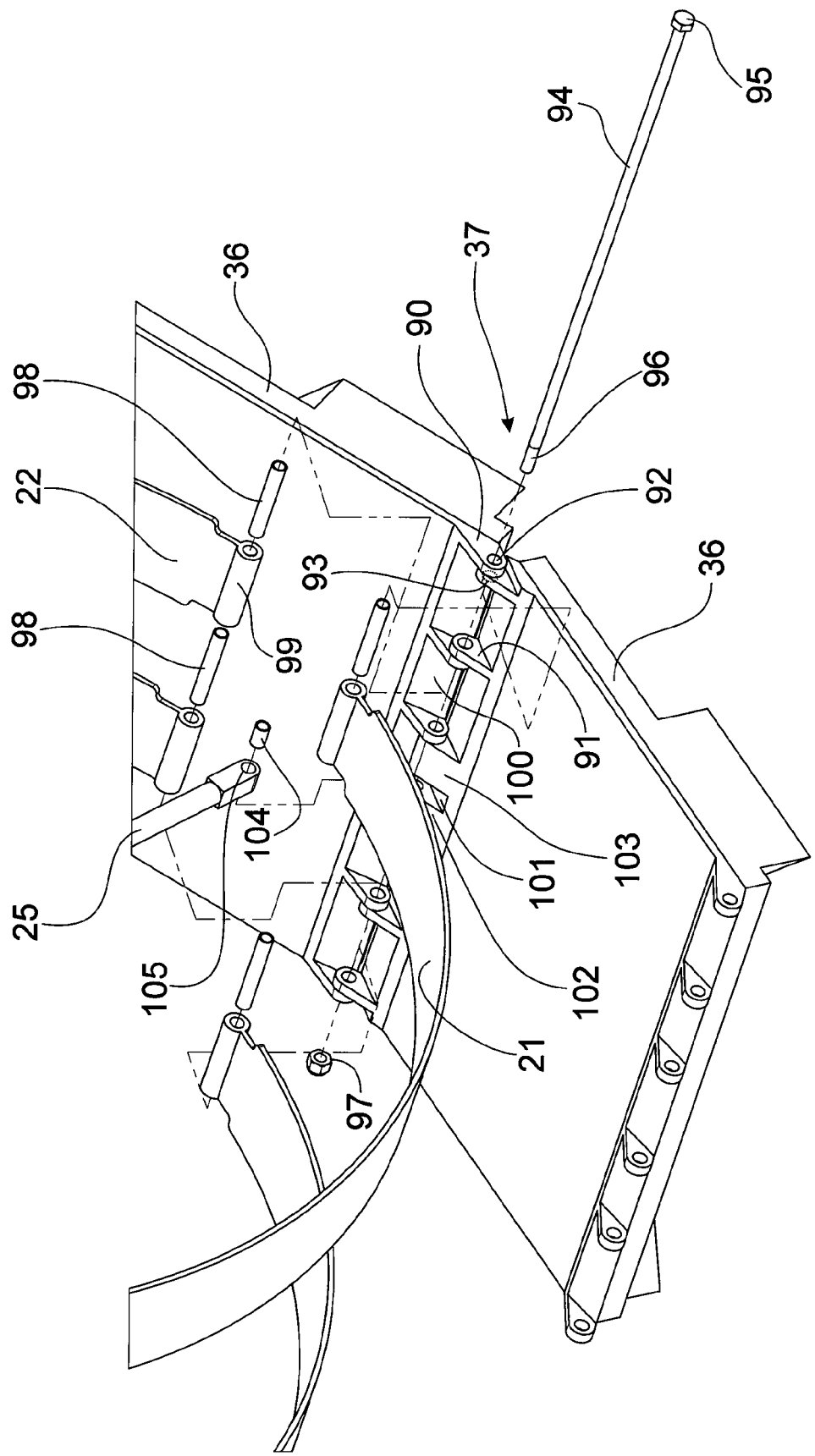
FIG. 15 shows a detailed perspective view of the outer connection means between the rim of the wheel assembly and the spring members.

In FIG. 3-4 there is shown a similar wheel assembly 35 to wheel assembly 10 as shown in FIGS. 1-2 with the exception that instead of a solid annular rim plate 26 there are provided a plurality of traction plates 36 pivotally linked together at connection locations 37 which are described in more detail in FIG. 15. Traction plates 36 have treads 39A attached thereto. The provision of traction plates 36 provide a deformable ring 38 and individual tractive elements 39 are fixed to an outer surface 40 of traction plates 36 as shown in FIG. 4.

Figure 5:
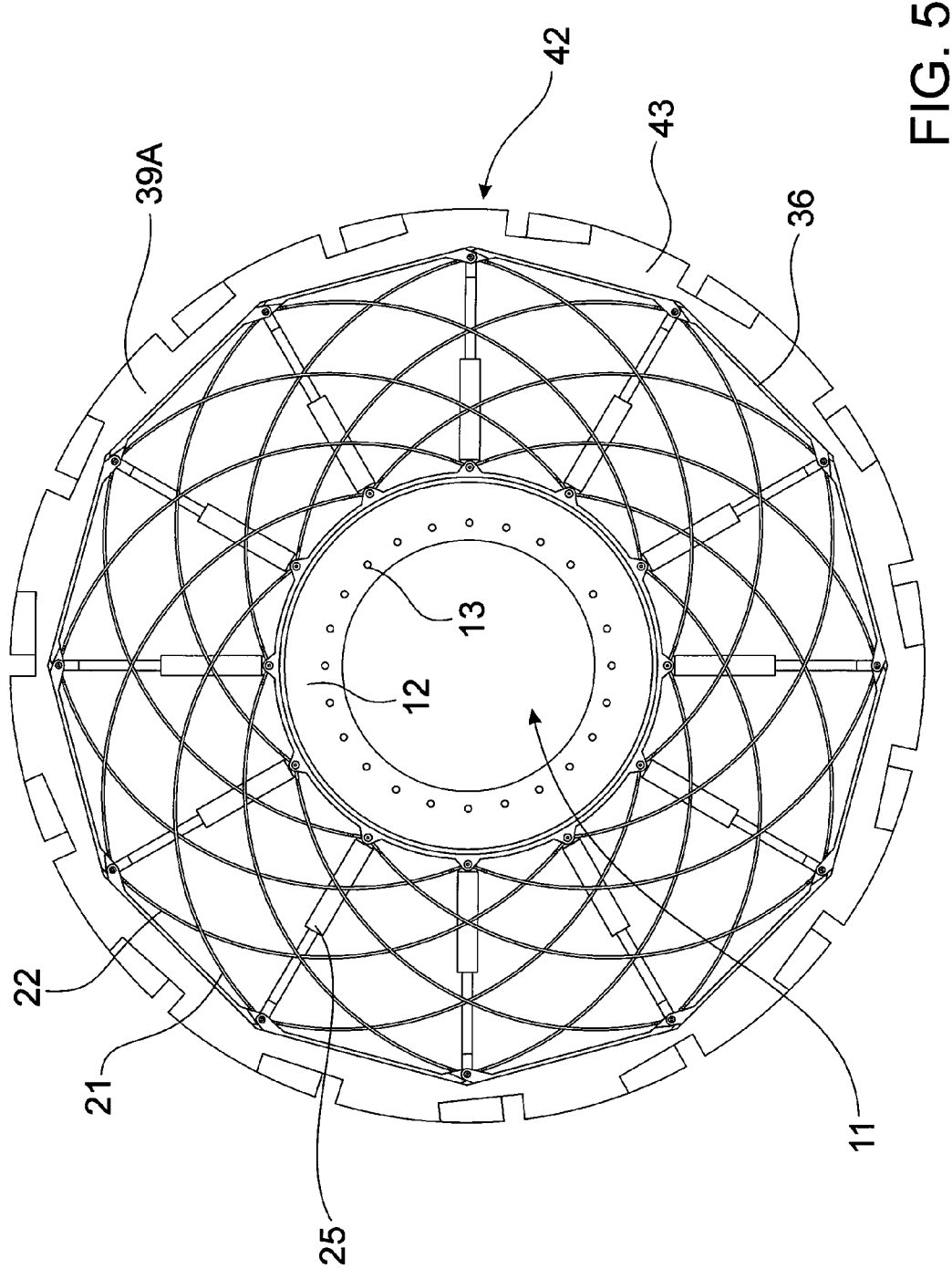
FIG. 5 shows a side view of a third embodiment of a wheel assembly of the invention.
Figure 6:
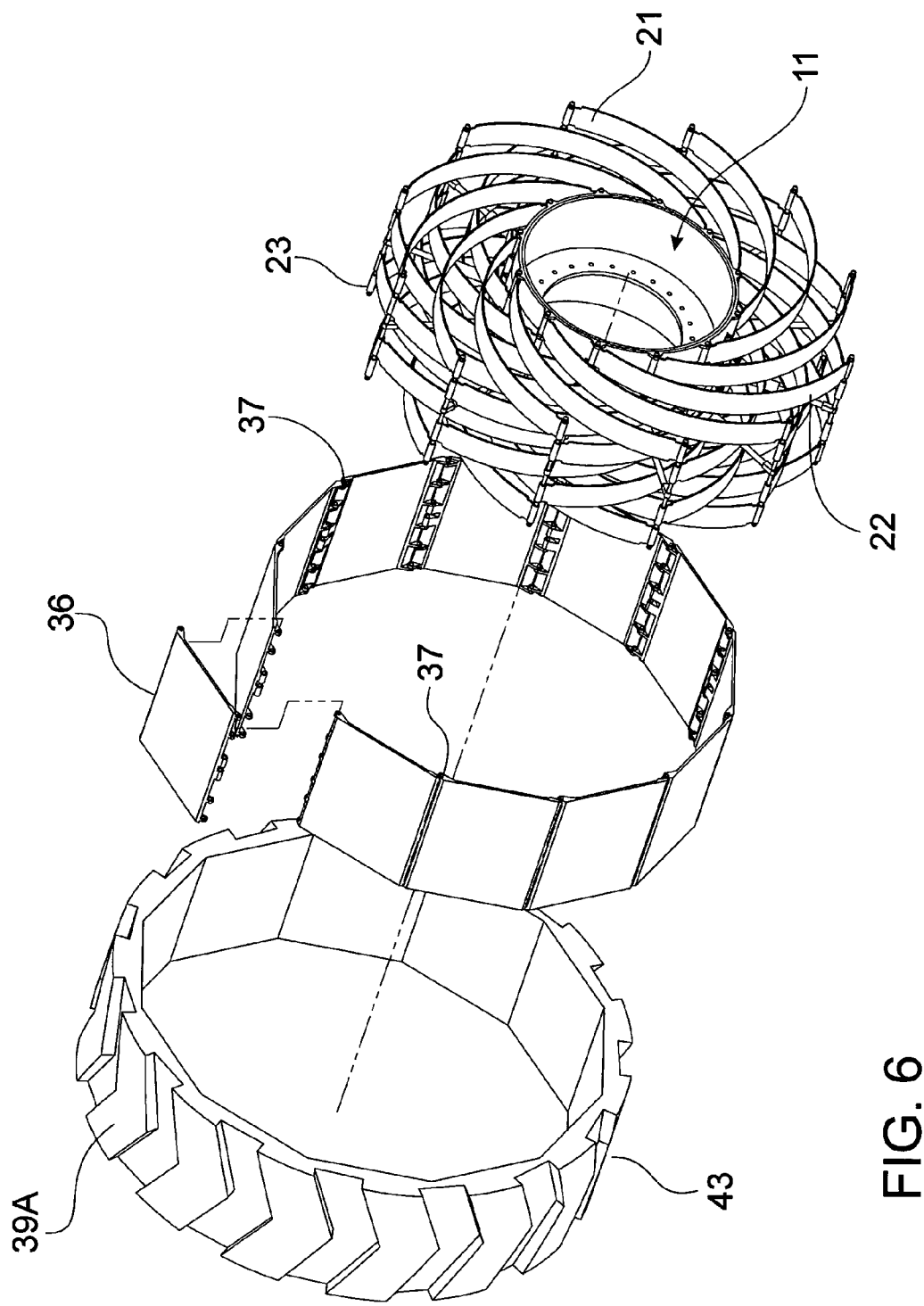
FIG. 6 shows an exploded perspective view of the wheel assembly of FIG. 5.

In the wheel assembly 42 shown in FIGS. 5-6 the only difference to the wheel assembly 35 shown in FIGS. 3-4 is that individual traction elements 39 are replaced by a single circumferential traction element 43 which is attached to traction plates 36.

Figure 7:
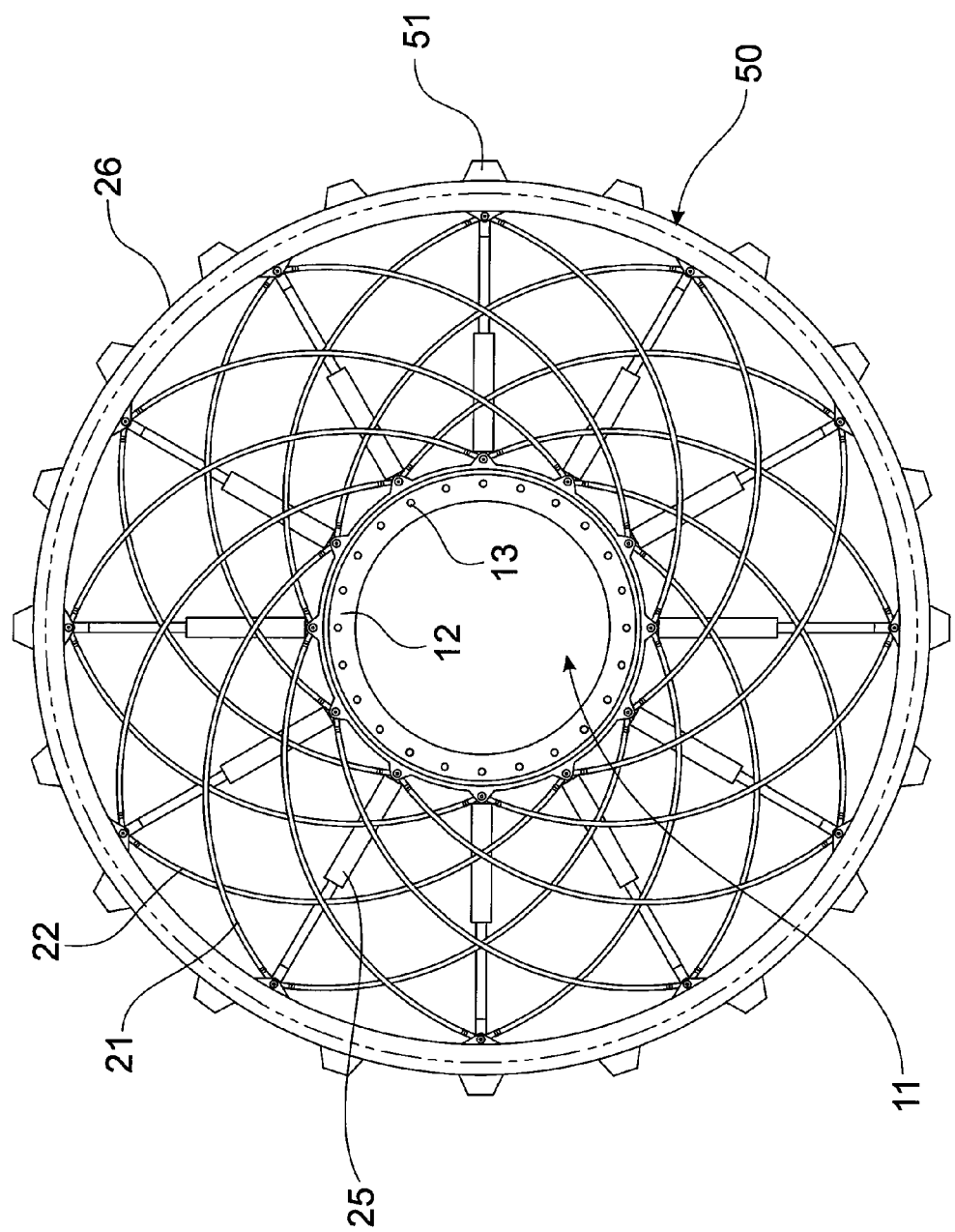
FIG. 7 shows a side view of a fourth embodiment of a wheel assembly of the invention.
Figure 8:
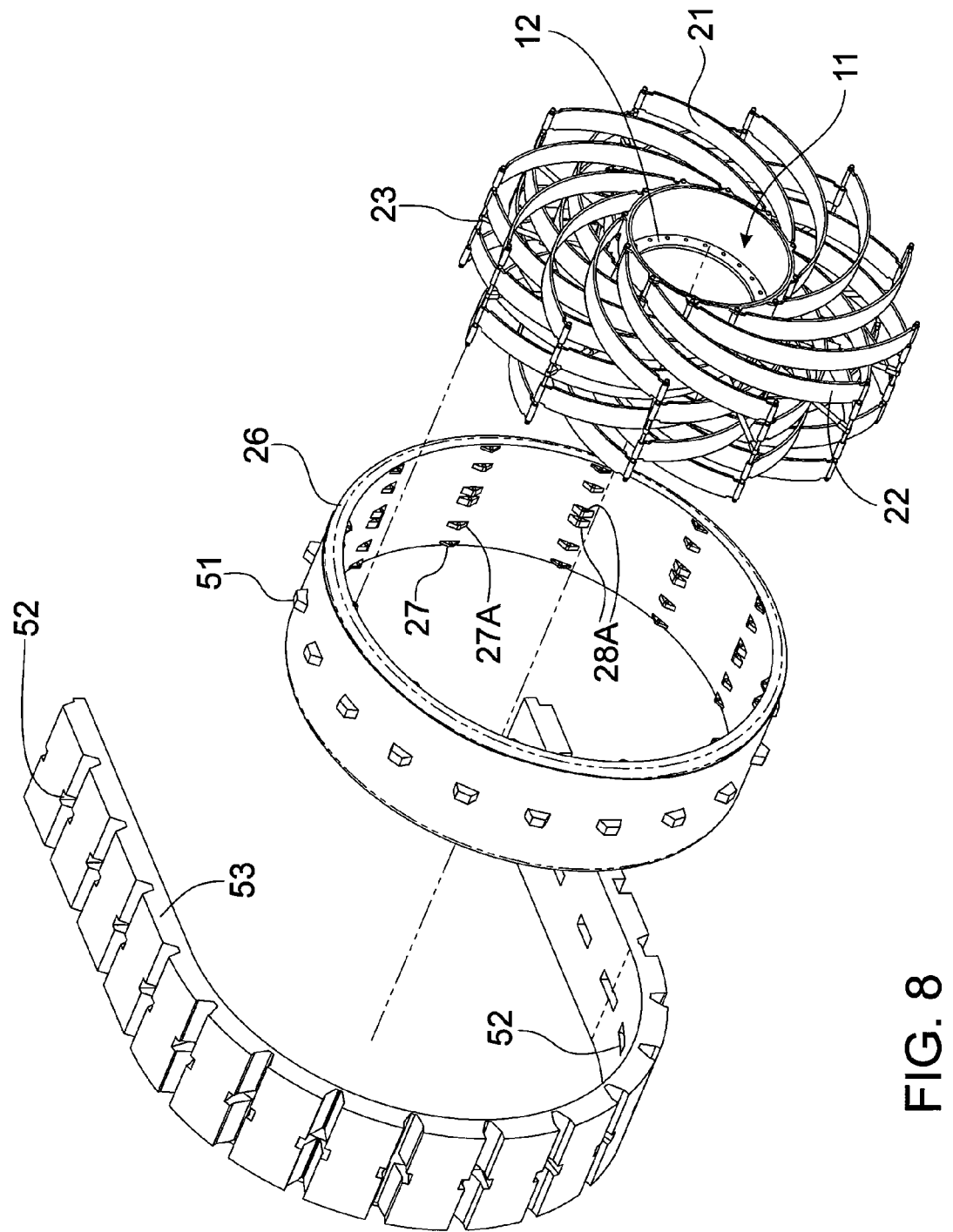
FIG. 8 shows an exploded perspective view of the wheel assembly of FIG. 7.

In the wheel assembly 50 shown in FIGS. 7-8 the only difference in relation to wheel assembly 10 shown in FIGS. 1-2 is that circumferential outer rim plate 26 is additionally provided with engagement lugs 51 which engage with track recesses 52 shown on track 53.

Figure 9:
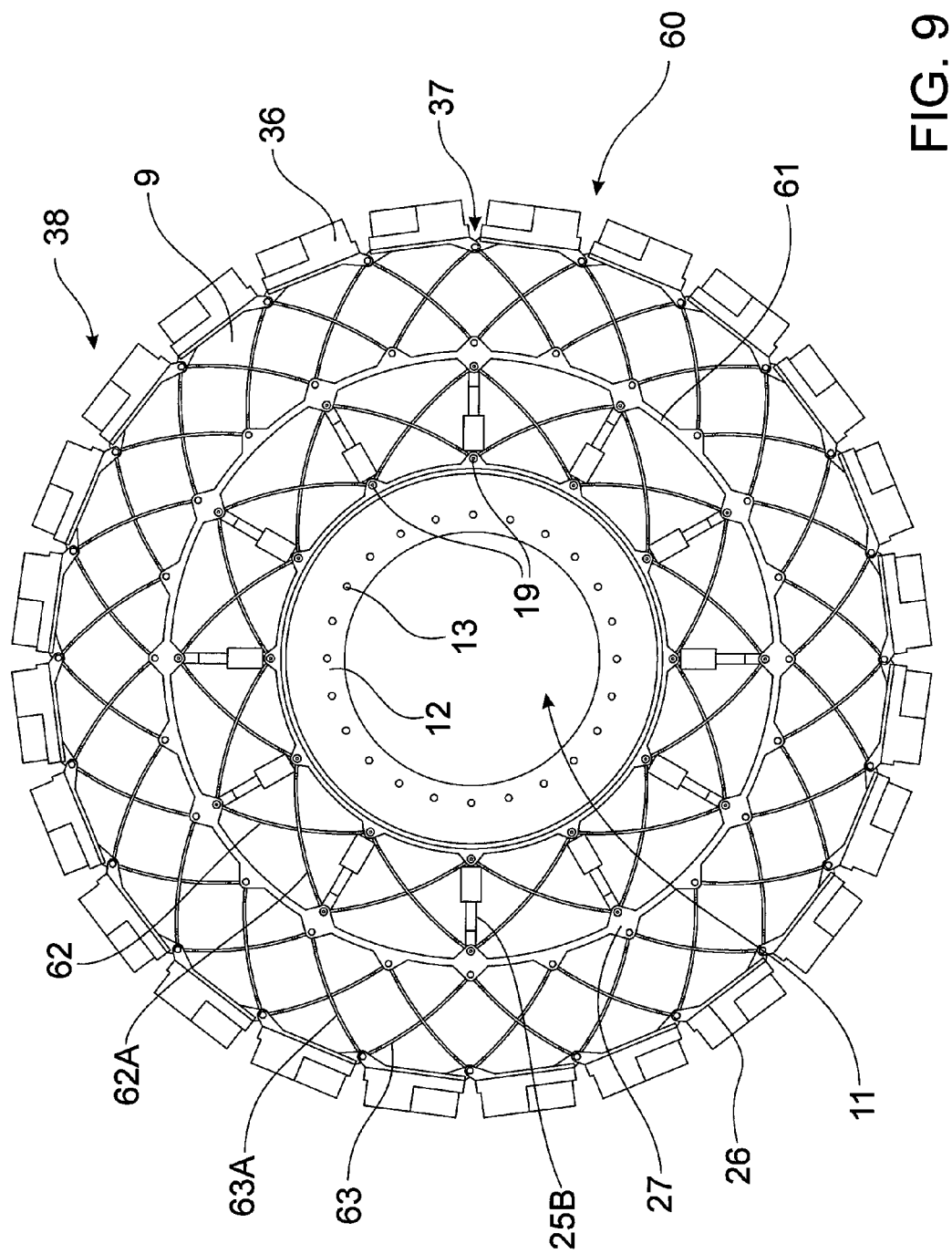
FIG. 9 shows a side view of a fifth embodiment of the wheel assembly of the invention.
Figure 10:
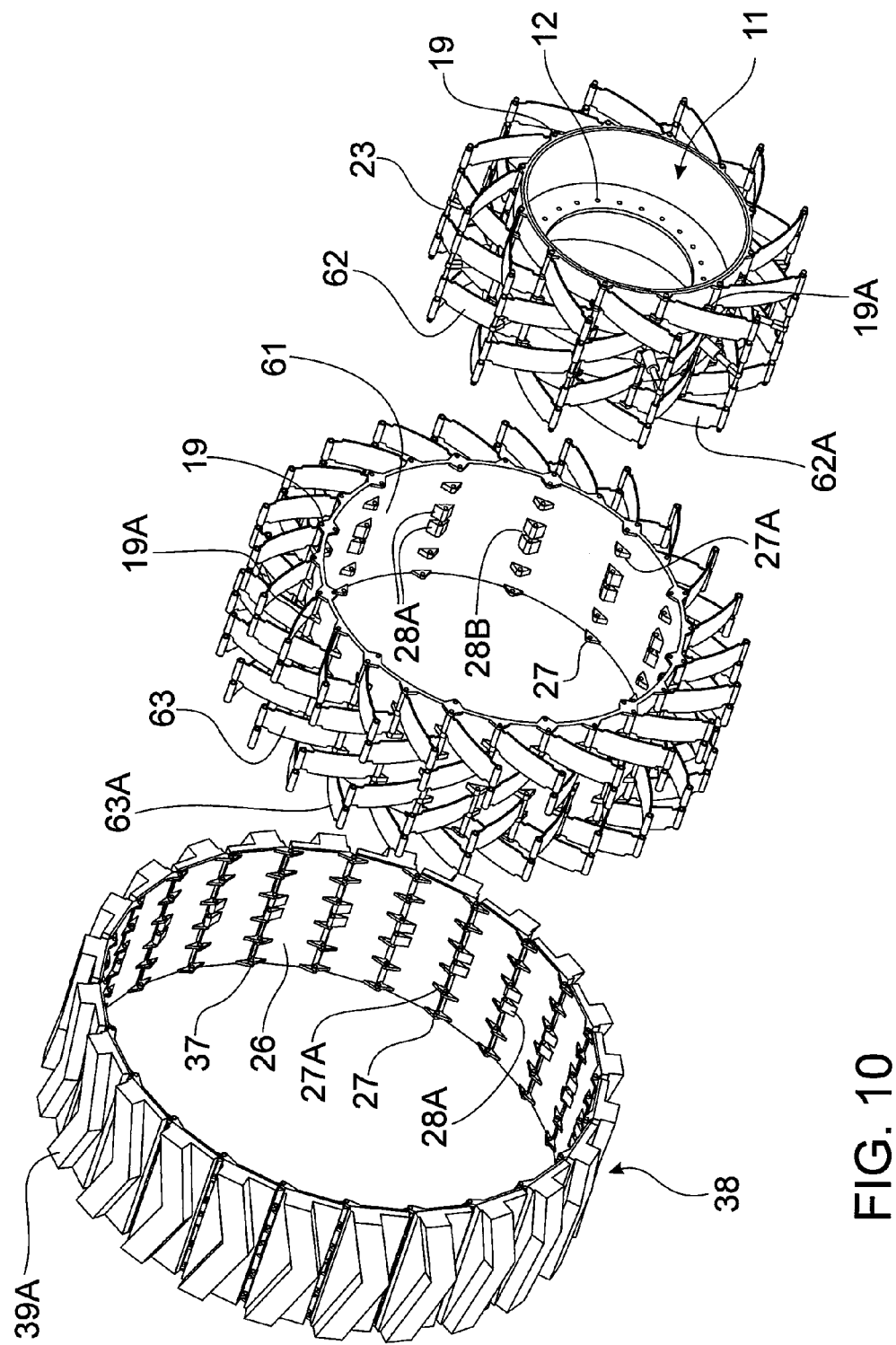
FIG. 10 shows an exploded perspective view of the wheel assembly of FIG. 9.

In wheel assembly 60 shown in FIGS. 9-10 the difference to the wheel assembly 35 shown in FIGS. 3-4 is the wheel provision of an intermediate ring 61 located between mounting plate 11 and deformable ring 38 and thereby replacing spring members 21 and 22 with an array of inner arcuate spring members 62 and 62A in opposing orientations and an array of outer arcuate spring members 63 and 63A in opposing orientations. The damping elements 25 shown in FIGS. 3-4 may be replaced by damping elements 25B located between intermediate ring 61 and mounting plate 11 or alternatively between intermediate ring 61 and deformable ring 38 (not shown).

Damping elements 25B are attached to attachment lugs 28A on intermediate ring 61 and springs 62 and 62A are attached to attachment lugs 27 and 27A. Springs 62 and 62A are also attached to lugs 19 and 19A. Springs 63 and 63A are attached to lugs 19 and 19A. Springs 63 and 63A are also attached to lugs 27 and 27A of deformable ring 38 shown in FIG. 10.

Figure 11:
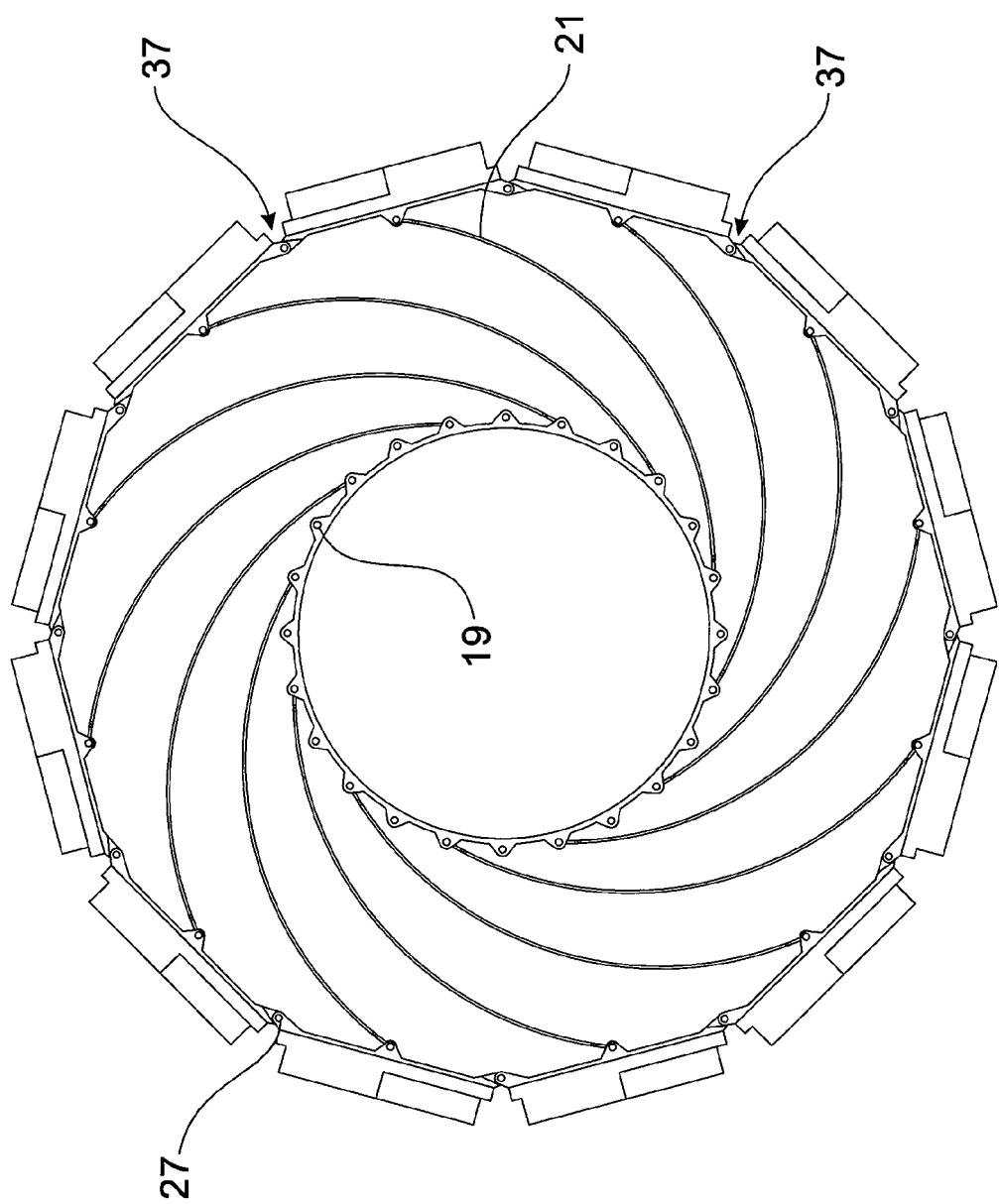
FIG. 11 shows a side view of a sixth embodiment of a wheel assembly of the invention.

In FIG. 11 there is shown a plurality of spring members 21 all having a similar orientation which are pivotally mounted at their respective outer ends to pinning lugs 27 and 27A (not shown) located intermediate between connection locations 37 of traction plates 36. Each of the respective inner ends of springs 21 are attached to opposed pinning locations 19 and 19A (not shown) as shown in FIG. 14. Opposing springs 22 have been omitted for convenience.

Figure 12:
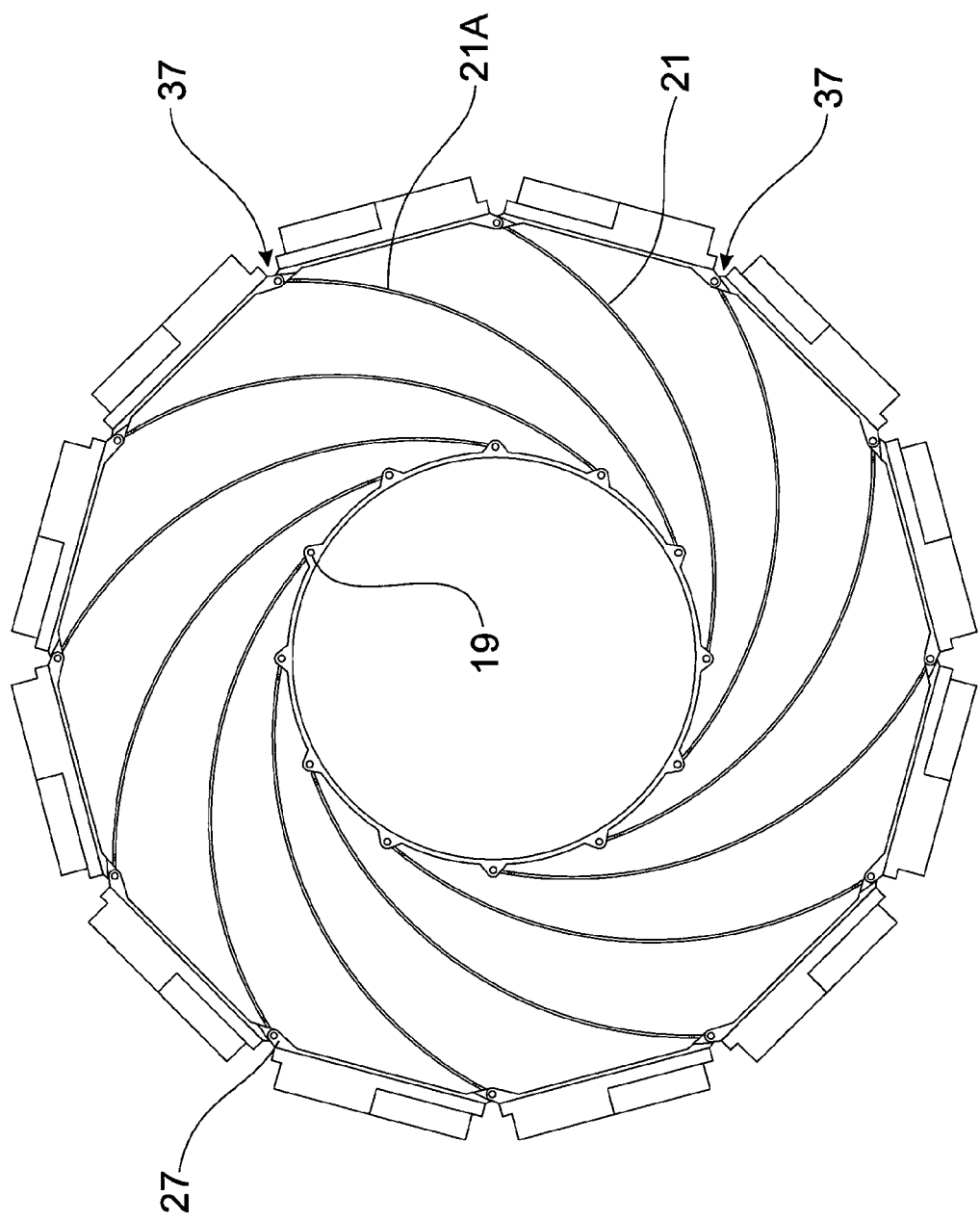
FIG. 12 shows a side view of a seventh embodiment of a wheel assembly of the invention.

In FIG. 12 springs 21 are shown pivotally attached to pinning lugs 27 associated with connection points 37 instead of being spaced therefrom as shown in FIG. 11.

Figure 13:
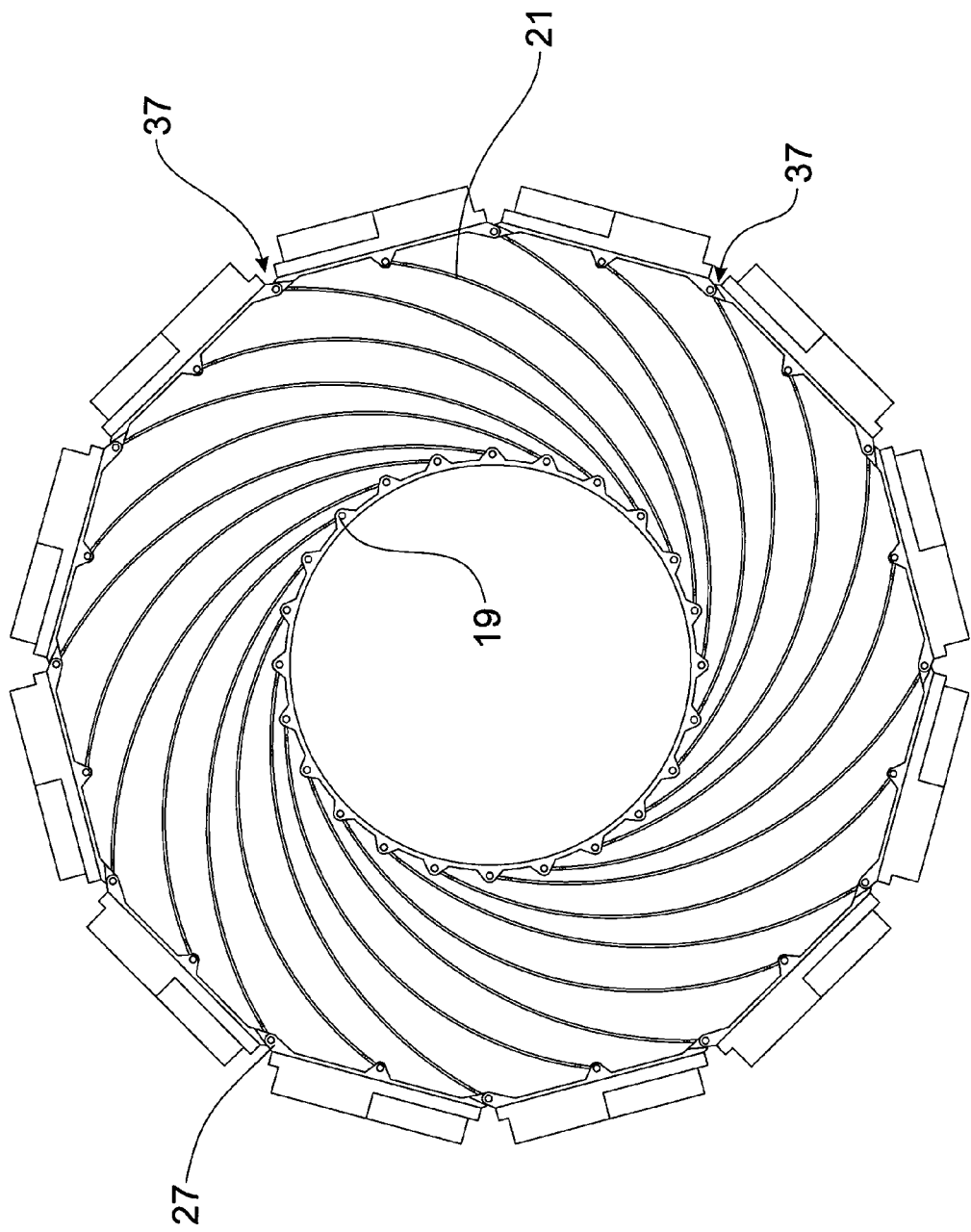
FIG. 13 shows a side view of an eighth embodiment of a wheel assembly of the invention.

In FIG. 13 there is shown a combination of the features of FIGS. 11-12 wherein instead of 12 spring members shown in each of FIGS. 11 and 12 there are shown 24 spring members 21 each pivotally attached to both pinning lugs 27 and connection points 37.

In FIG. 14 there is shown each of spring members 21 and 22 attached to hub connection member 11 as described above through the agency of opposed pinning lugs 19 and 19A. To facilitate such attachment there is also shown pivot pins 72 insertable in mating sleeves 73 at the ends of each of spring members 21. Each of sleeves 73 are hollow and thus allow insertion of a bolt 74 having head 75 and nut 76 screw threadedly attached to adjacent screw threaded end 77. Bolt 74 is inserted through co-aligned apertures 78 in lugs 19 and 19A.

In regard to the attachment of spring members 22 and damping elements 25 to hub connection 11 this is accomplished by elongate bolts 80 which are longer than bolts 74. Bolts 80 are inserted through aperture 81 in a first pinning lug 20 which is aligned with corresponding passages 82 in opposed pinning lugs 28A and passage 81 in a second pinning lug 20. Bolt 80 has head 83 and screw threaded end 84 which is engaged by nut 85 to facilitate attachment of spring members 22 and damping elements 25 to hub connection member 11. Between each of pinning lugs 28A there is a space 86 which facilitates attachment of dampening elements 25 to hub connection member 11. This is accomplished by pivot pins 87 located in spaces 86 through which bolts 80 are inserted. Pivot pins 87 are inserted through hollow bores (not shown) in an adjacent inner end of dampening elements 25.

In FIG. 15 there is shown connection locations 37 between adjacent traction elements 36 and it will be noted each connection location 37 comprises a plurality of spaced lugs 90 of one traction element 36 abutting a plurality of adjoining spaced lugs 91 of an adjacent traction element 36 and thereby providing co-aligned apertures 92 and 93 for insertion of an elongate fastener 94 having a head 95 and screw threaded end 96 for attachment of nut 97 whereby each of adjacent traction elements 36 are attached to each other as shown. Each of the outer ends of springs 21 and 22 are attached to pivot pins 98 which engage with corresponding sleeves 99 as shown. The fastener 94 is insertable through the hollow interior of each pivot pin 98. Sleeves 99 are located in mating recesses 100 as shown. Damping elements 25 have outer ends that are located in recesses 101 between adjacent projections 102 and 103 and are engaged by pivot pins 104 insertable through a co-aligned passage 105 in each damping element 25. Pivot pins 104 have fastener 94 inserted through their hollow interiors as shown.

Figure 16:
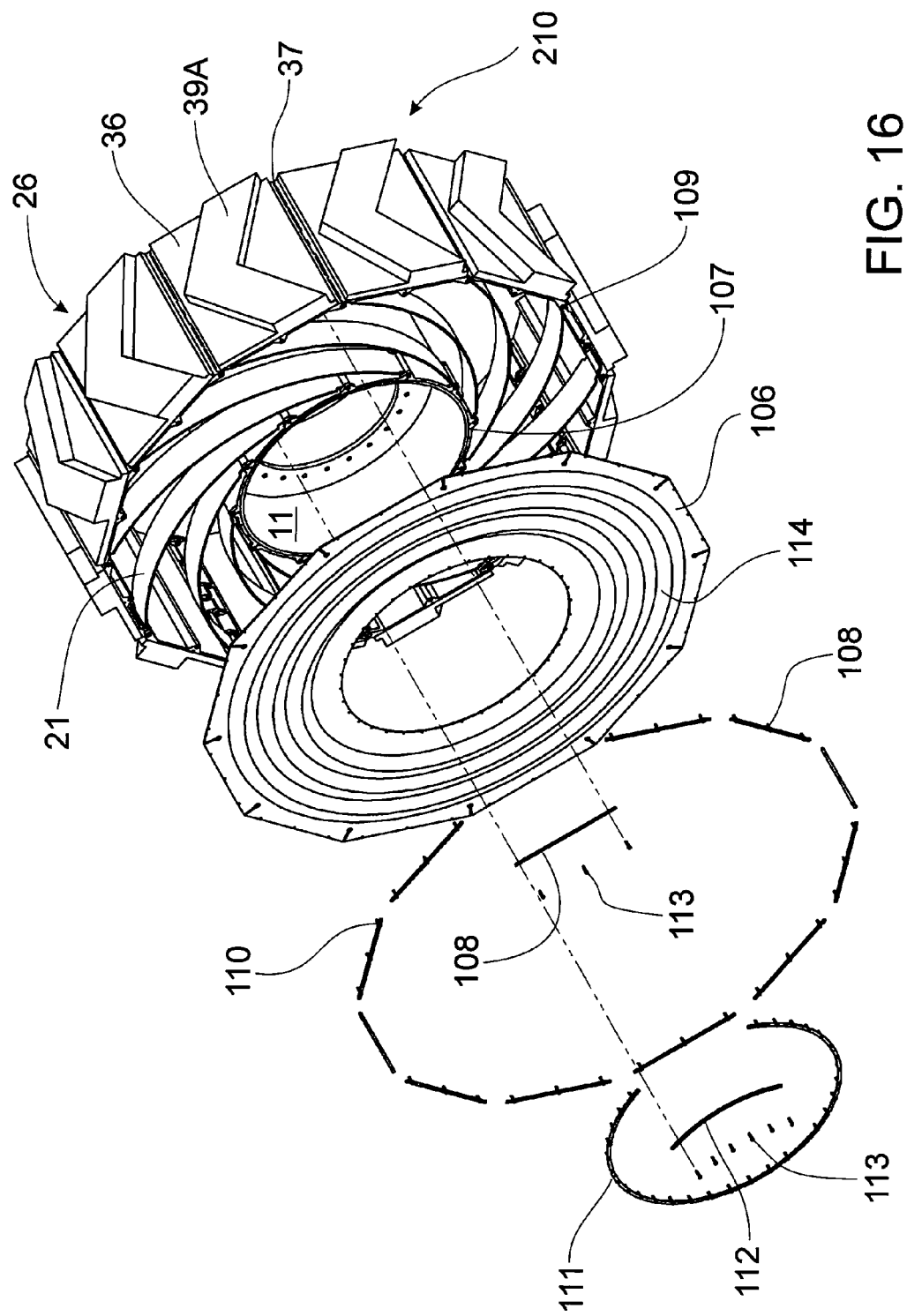
FIGS. 16-17 show a perspective view of a safety cover fitted to the wheel assembly.
Figure 17:
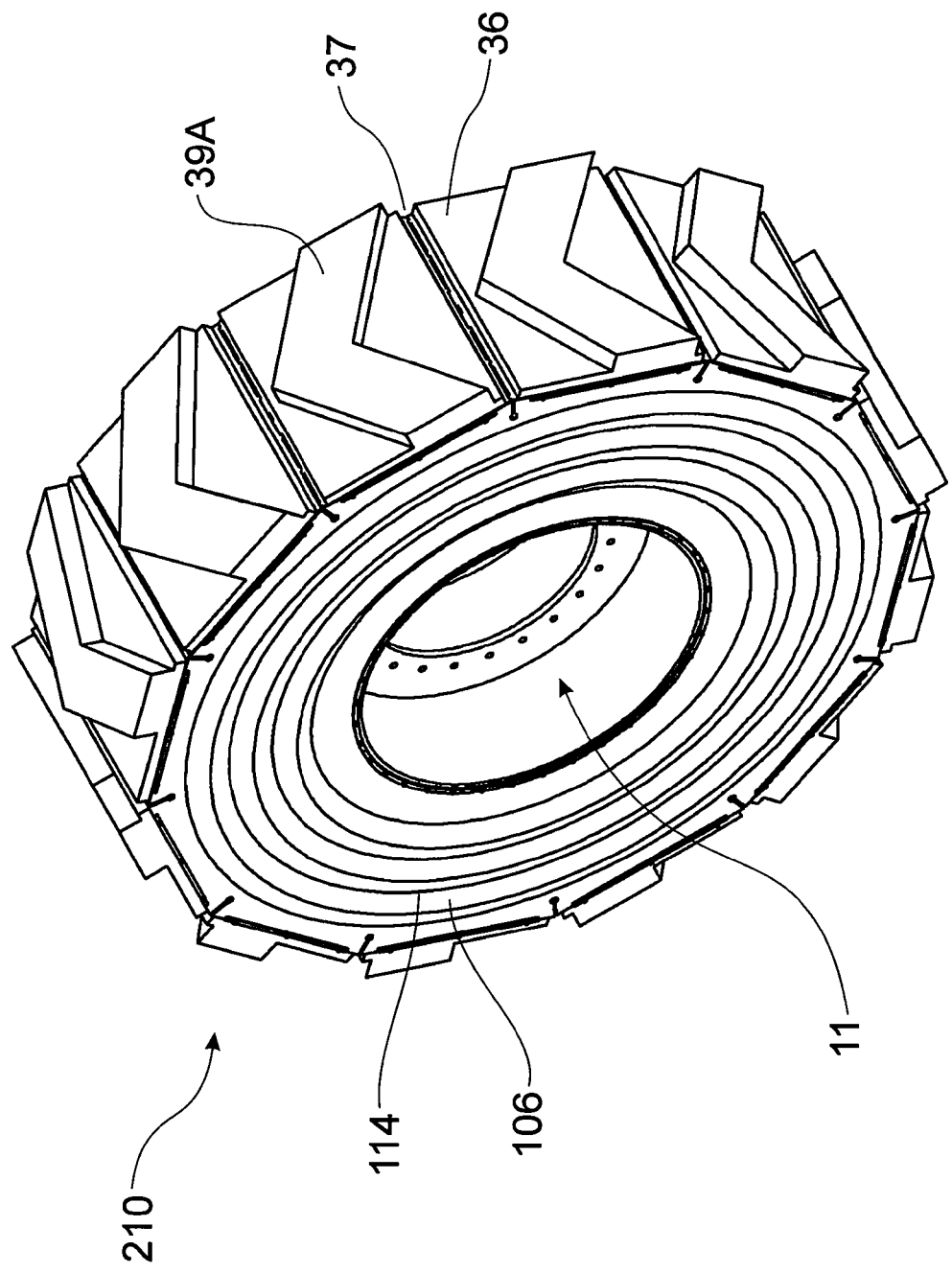

In FIGS. 16-17 a wheel assembly 210 is shown with a safety cover 106 which is attachable to edge 107 of hub connection member 11. There is also shown outer metal clamping strips 108 which are attached to mating edge 109 of outer rim assembly 26 by fasteners 110. There is also provided inner metal clamping ring 111 having segments 112 for attachment to edge 107 by fasteners 113. Safety cover 106 has resilient corrugations 114 to facilitate flexibility without bulging.

Figure 18:
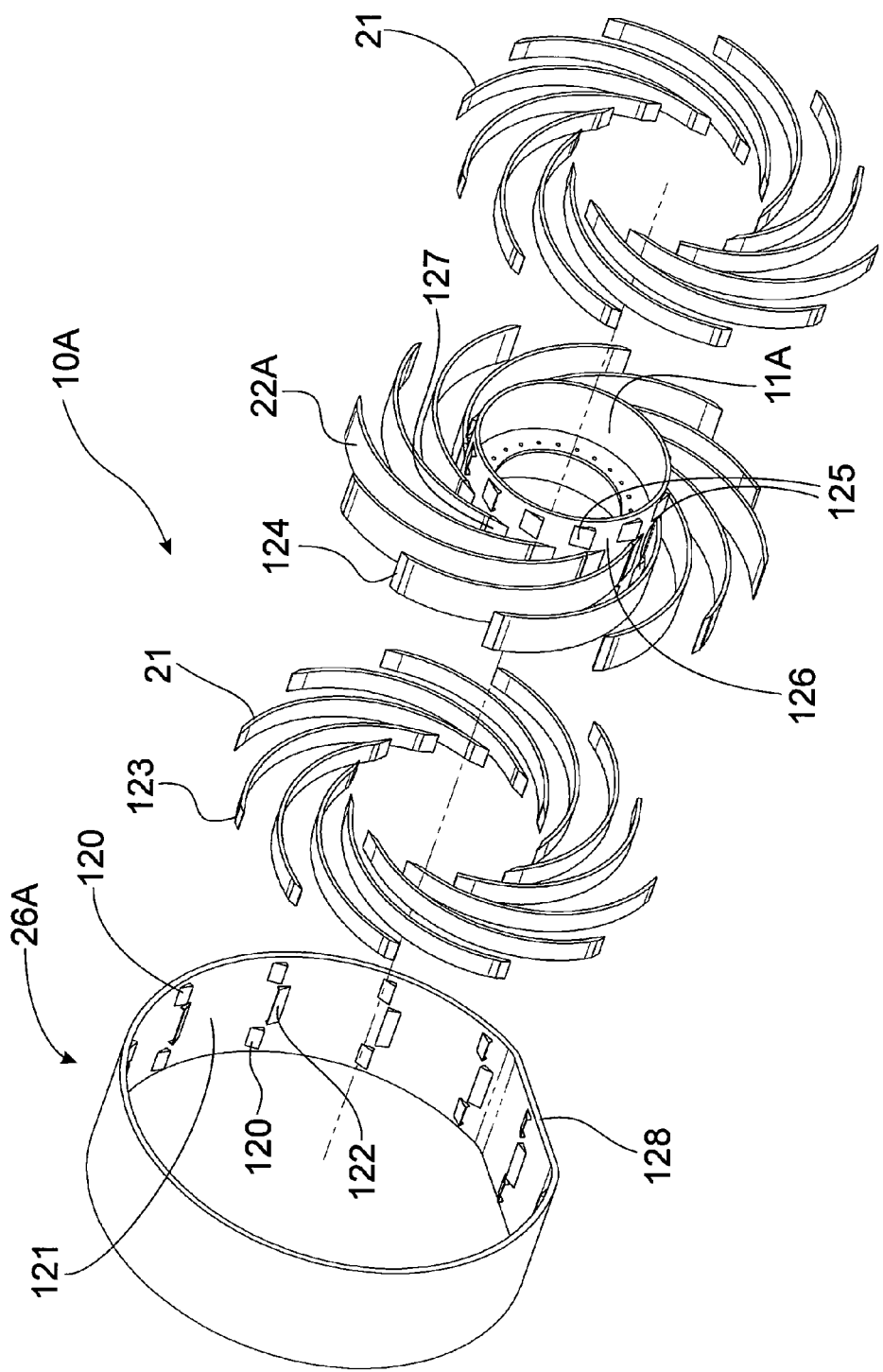

Reference may be made to another embodiment as shown in FIGS. 18-21 wherein in both FIG. 18 which shows an exploded view and FIG. 19 which shows an assembly of the components of FIG. 18 the pair of arrays of inner springs 22 described in previous embodiments may be replaced by a single array of springs 22A which typically have twice the thickness of the pair of outer springs 21. The substitution of the pair of arrays of inner springs 22 by the single array of springs 22A which are wider and designed to provide the same torsional and suspensive characteristics as wheel assembly 10 but making wheel assembly 10A laterally stronger. This additional lateral strength is beneficial when the wheel assembly 10A is cornering or rotating on the side of a hill and thus will enable the wheel assembly 10A to twist or be subject to a lateral force involving movement of the centre of gravity of the wheel away from the geometrical centre.

It will be noted that each of springs 21 may engage in pockets 120 on either side of the inner surface 121 of outer rim assembly 26A and that springs 22A engage in mating pockets 122. In this regard springs 21 may be bevelled at 123 at each end and springs 22A bevelled at 124 at each end.

The inner mounting plate 11A may also be provided with pockets 125 on each side of the outer surface 126 of mounting plate 11 and central pockets 127 similar to pockets 122 referred to above.

The outer rim assembly 26A may be made from strong flexible material such as composite fibre products. One example is E-glass which is a low alkali borosilicate glass reinforced epoxy composite. Thus outer rim assembly 26A may be formed from plastics material such as thermoplastic polymers including polyamides or polyesters reinforced with E-glass. The E-glass may be supplied in the form of chopped strands or milled fibres. Alternatively other composite fibres such as carbon fibres may be used.

The outer rim assembly 26A being formed from flexible material may also be flattened when it contacts the road or support surface as shown at 128. It is stressed that this only applies in use and that the rim 26A will be circular otherwise.

A detail "B" of pockets 120 is shown in FIGS. 20-21 where springs 21 in the form of straps will engage with pockets 120 as shown. This also applies to pockets 122, 125 and 127. Springs 21 as shown in FIGS. 19-20 may be strap like in shape as shown in FIG. 19 or be provided with a neck or waisted portion 129. Preferably springs 21, 22 or 22A may be formed from different flexible material to the outer rim assembly 26A. It will also be appreciated that mounting plate 11A may also be formed from flexible material. It is considered that folding of straps 21, 22 and 22A at neck 129 may take place thereby providing a hinging effect. This hinging effect may also be achieved by using different flexible materials for the pockets as well as the springs.

Having regard to the embodiment of FIGS. 18-21, it will be appreciated that the following possibilities may occur, i.e.

1. There may be an even or odd number of spring arrays along the axis of the wheel assembly 10 or 10A, which may all be of equal or varying widths. However it is likely that use will be made of double width springs 22A to provide better lateral resistance, and to reduce the number of parts required.

2. The springs 21, 22 and 22A may be attached to the outer rim assembly 26A, and the inner mounting plate 11A by fitting into pockets after transversing compartment 109, either by using a friction fit or secured by other means which may be mechanical.

3. The springs may be of uniform or non-uniform thickness over their length.

4. The springs may be pinned or may be necked to effectively produce a hinge without the need for conventional pinning.

5. The springs may be manufactured using a single material or may be a composite of different materials. This may be particularly useful in creating effective 'hinges' by using a different thickness of material or a combination of different materials (eg just a short length of really flexible material), rather than using a regular pinning mechanism.

6. The outer rim assembly 26A may be constructed of a continuous (or non-continuous) flexible material to permit deflection under load.

Figure 22:
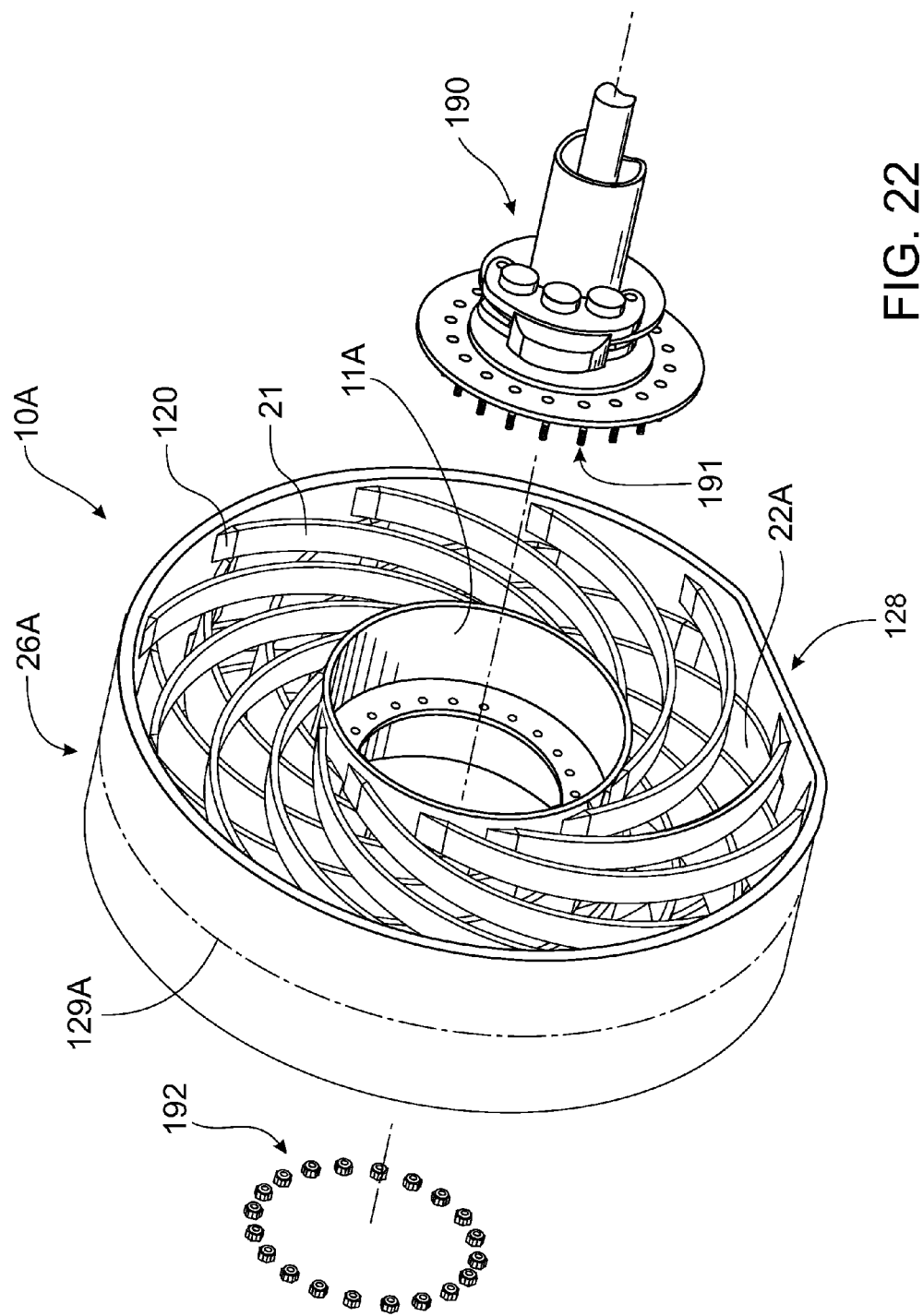

FIG. 22 shows the wheel assembly 10A when assembled in company with a vehicle hub 190. A series of studs 191 extend outwardly to engage the wheel assembly 10A and be held in place by nuts 192. This embodiment is still under load as shown by flattening at 128.

It therefore will be appreciated from the above that the non-pneumatic tyre of the invention has substantial advantages over the prior art discussed above because of the provision of counteracting springs 21, 22 and 22A which provide the necessary strength for use as a non pneumatic wheel.

The invention claimed is:

1. A non-pneumatic wheel assembly which has
   (i) an outer rim assembly (26, 26A);
   (ii) an inner vehicle hub connection member (11, 11A);
   (iii) a compartment (9) located between the outer rim assembly (26, 26A) and the inner hub connection member (11, 11A);
   (iv) at least one pair of arrays of spring elements (21);
   (v) at least one other array of spring elements (22,22A); and
   (vi) at least some of the spring elements (21, 22) of both the at least one pair of arrays of spring elements and the at least one other array of spring elements attached to the outer rim assembly (26) and to the inner vehicle hub connection member (11), wherein:
   the spring elements (21, 22) of both the at least one pair of arrays of spring elements and the at least one other array of spring elements are arcuate and the spring elements (21) of the at least one pair of arrays of spring elements are arranged in an opposing or counteracting orientation being convexly curved in a first circumferential direction of the wheel assembly, to the spring elements of the at least one other array (22, 22A) being convexly curved in a second circumferential direction of the wheel assembly opposite to the first circumferential direction; and
   each of the respective arrays of the at least one pair of arrays (21) of spring elements and the at least one other array (22, 22A) of spring elements is located in a plane that is different from the planes in which the other arrays are located.

2. A non-pneumatic wheel assembly as claimed in claim 1 wherein each of the spring elements of both the at least one pair of arrays of spring elements and the at least one other array of spring elements has a shape corresponding substantially to an arc of a circle.

3. A non-pneumatic wheel assembly as claimed in claim 1 which includes one pair of arrays of spring elements (21) and one other array of spring elements (22,22A).

4. A non-pneumatic wheel assembly as claimed in claim 1 including one pair of arrays of spring elements (21) and wherein the at least one other array of spring elements (22, 22A) includes two arrays of spring elements (22, 22A).

5. A non-pneumatic wheel assembly as claimed in claim 1 wherein the outer rim assembly comprises a solid annular member covered in rubber or other suitable elastomeric material.

6. A non-pneumatic wheel assembly as claimed in claim 1 wherein the outer rim assembly comprises a flexible or deformable annular member comprising a plurality of traction or rim elements pivotally or hingedly connected to each other.

7. A non-pneumatic wheel assembly as claimed in claim 6 wherein the traction or rim elements are in the form of plates.

8. A non-pneumatic wheel assembly as claimed in claim 6 wherein each of the traction elements has an outer rubber tread element attached thereto so that the outer rim assembly comprises a plurality of traction elements covered in tread elements thereby providing a multiplicity of pads all hingedly connected to each other.

9. A non-pneumatic wheel assembly as claimed in claim 6 wherein the plurality of traction elements are covered by an annular member of solid rubber.

10. A non-pneumatic wheel assembly as claimed in claim 1 wherein the outer rim assembly is covered with an annular rubber sheath as a friction grip drive for use of the non-pneumatic wheel assembly on an internal surface of tracks of machinery.

11. A non-pneumatic wheel assembly as claimed in claim 1 wherein the outer rim assembly has elevated teeth for use on an internal surface of tracks of machinery to provide a positive drive for tracks with central drive sprocket apertures.

12. A non-pneumatic wheel assembly as claimed in claim 1 wherein the inner vehicle hub connection member is a solid annular member which has an inwardly extending flange having a plurality of attachment apertures for attachment to a hub of a vehicle.

13. A non-pneumatic wheel assembly as claimed in claim 12 wherein the inner hub connection member on an internal surface thereof has a plurality of races for supporting the spring elements.

14. A non-pneumatic wheel assembly as claimed in claim 13 wherein at least one race supports an array of spring elements which are curved or arcuate and all oriented in a similar direction.

15. A non-pneumatic wheel assembly as claimed in claim 1 wherein there are provided inner attachment means for the spring elements comprising a plurality of attachment lugs or pinning lugs for attachment of a proximal end of an adjacent spring element to the inner hub connection member.

16. A non-pneumatic wheel assembly as claimed in claim 15 wherein there are provided opposed pairs of pinning lugs whereby the end of a respective spring element may be attached to a suitable pair of lugs by an appropriate fastener.

17. A non-pneumatic wheel assembly as claimed in claim 1 wherein there are provided outer attachment means for the spring elements in the form of pairs of spaced lugs which pairs of spaced lugs extend away from an internal surface of the outer rim assembly.

18. A non-pneumatic wheel assembly as claimed in claim 1 incorporating a plurality of damping elements to act in conjunction with the spring elements to limit unwanted movement or excitation of the spring elements.

19. A non-pneumatic wheel assembly as claimed in claim 18 wherein the damping elements comprise hydraulic ram assemblies, gas struts or members having a suitably inwardly directed bias ensuring that the wheel assembly has a circular shape.

20. A non-pneumatic wheel assembly as claimed in claim 1 wherein each spring element of each array is similar in cross-sectional shape.

21. A non-pneumatic wheel assembly as claimed in claim 1 wherein there is provided at least one intermediate ring between the inner hub connection member and the outer rim assembly.

22. A non-pneumatic wheel assembly as claimed in claim 1 wherein the other array is a double array of spring elements with each of the pair of arrays of spring elements located on an outer side of the non-pneumatic wheel assembly and the other array of spring elements is interposed between each outer array of spring elements and comprises a single array of spring elements having a width that is substantially greater than spring elements of each of the pair of arrays.

23. A non-pneumatic wheel assembly as claimed in claim 22 wherein each of the spring elements of said double array and said pair of arrays are attached to pockets located on an outer surface of the inner vehicle hub connection member and also located on an inner surface of the outer rim assembly.

24. A non-pneumatic wheel assembly which has
(i) an outer rim assembly (26, 26A);
(ii) an inner vehicle hub connection member (11, 11A);
(iii) a compartment (9) located between the outer rim assembly (26, 26A) and the inner hub connection member (11, 11A);
(iv) at least one pair of arrays of spring elements (21);
(v) at least one other array of spring elements (22,22A); and
(vi) at least some of the spring elements (21, 22) of both the at least one pair of arrays of spring elements and the at least one other array of spring elements attached to the outer rim assembly (26) and to the inner vehicle hub connection member (11);
wherein
the spring elements (21, 22) of both the at least one pair of arrays of spring elements and the at least one other array of spring elements are arcuate and the spring elements (21) of the at least one pair of arrays of spring elements are arranged in an opposing or counteracting orientation being convexly curved in a first circumferential direction of the wheel assembly, to the spring elements of the at least one other array (22, 22A) being convexly curved in a second circumferential direction of the wheel assembly opposite to the first circumferential direction, the assembly includes one pair of arrays of spring elements (21) and one other array of spring elements (22,22A), and
the other array of spring elements (22A) has a width that is approximately twice that of the spring elements (21) of the one pair of arrays.

25. A non-pneumatic wheel assembly which has
(i) an outer rim assembly (26, 26A);
(ii) an inner vehicle hub connection member (11, 11A):
(iii) a compartment (9) located between the outer rim assembly (26, 26A) and the inner hub connection member (11, 11A);
(iv) at least one pair of arrays of spring elements (21);
(v) at least one other array of spring elements (22, 22A); and
(vi) at least some of the spring elements (21, 22) of both the at least one pair of arrays of spring elements and the at least one other array of spring elements attached to the outer rim assembly (26) and to the inner vehicle hub connection member (11), wherein
the spring elements (21, 22) of both the at least one pair of arrays of spring elements and the at least one other array of spring elements are arcuate and the spring elements (21) of the at least one pair of arrays of spring elements are arranged in an opposing or counteracting orientation being convexly curved in a first circumferential direction of the wheel assembly, to the spring elements of the at least one other array (22, 22A) being convexly curved in a second circumferential direction of the wheel assembly opposite to the first circumferential direction, and
a first array of spring elements (21) of the at least one pair of arrays of spring elements and a corresponding second array of spring elements (21) of the at least one pair of arrays of spring elements are located laterally and symmetrically to each other in relation to a central vertical plane (29*a*) extending through the outer rim assembly (26A) and the inner vehicle hub connection member (11A).

26. A non-pneumatic wheel assembly as claimed in claim 25 wherein the at least one other array of spring elements (22, 22A) includes two arrays of spring elements (22) located laterally and symmetrically with each other with respect to a central vertical plane (29A) extending through the outer rim assembly (26) and the inner vehicle hub connection (11).

* * * * *